US008992796B2

(12) United States Patent
Hasebe et al.

(10) Patent No.: US 8,992,796 B2
(45) Date of Patent: Mar. 31, 2015

(54) POLYMERIZABLE LIQUID CRYSTAL COMPOSITION

(75) Inventors: Hiroshi Hasebe, Saitama (JP); Yasuhiro Kuwana, Saitama (JP); Isa Nishiyama, Saitama (JP)

(73) Assignee: DIC Corporation, Tokyo (JP)

( * ) Notice: Subject to any disclaimer, the term of this patent is extended or adjusted under 35 U.S.C. 154(b) by 424 days.

(21) Appl. No.: 13/202,146

(22) PCT Filed: Feb. 18, 2010

(86) PCT No.: PCT/JP2010/052438
§ 371 (c)(1),
(2), (4) Date: Nov. 2, 2011

(87) PCT Pub. No.: WO2010/095680
PCT Pub. Date: Aug. 26, 2010

(65) Prior Publication Data
US 2012/0056129 A1    Mar. 8, 2012

(30) Foreign Application Priority Data

Feb. 20, 2009  (JP) ................................ 2009-037781
Mar. 13, 2009  (JP) ................................ 2009-061068

(51) Int. Cl.
| | | |
|---|---|---|
| *C09K 19/52* | (2006.01) | |
| *C09K 19/54* | (2006.01) | |
| *C09K 19/32* | (2006.01) | |
| *C09K 19/34* | (2006.01) | |
| *C09K 19/16* | (2006.01) | |
| *C08F 2/48* | (2006.01) | |
| *C08F 2/50* | (2006.01) | |
| *C08F 20/10* | (2006.01) | |
| *C09K 19/20* | (2006.01) | |
| *G02B 5/22* | (2006.01) | |
| *G02B 5/30* | (2006.01) | |
| *C09K 19/04* | (2006.01) | |

(52) U.S. Cl.
CPC . *C09K 19/16* (2013.01); *C08F 2/48* (2013.01); *C08F 2/50* (2013.01); *C08F 20/10* (2013.01); *C09K 19/2007* (2013.01); *G02B 5/223* (2013.01); *G02B 5/3016* (2013.01); *C09K 19/52* (2013.01); *C09K 19/54* (2013.01); *C09K 2019/0448* (2013.01); *C09K 2019/3408* (2013.01); *C09K 2019/3422* (2013.01)
USPC ............. 252/299.01; 252/299.5; 252/299.61; 252/299.62

(58) Field of Classification Search
USPC ................ 428/1.1; 252/299.01, 299.5, 299.6, 252/299.67, 299.61, 299.62
See application file for complete search history.

(56) References Cited

U.S. PATENT DOCUMENTS

| | | | |
|---|---|---|---|
| 6,218,578 B1 * | 4/2001 | Coates et al. ................... | 568/61 |
| 6,459,847 B1 * | 10/2002 | Van De Witte et al. ....... | 385/147 |
| 2004/0175513 A1 | 9/2004 | Verrall et al. | |
| 2007/0134444 A1 | 6/2007 | Harding et al. | |
| 2008/0055521 A1 | 3/2008 | Mizutani et al. | |
| 2009/0273741 A1 * | 11/2009 | Amimori et al. ................ | 349/75 |

FOREIGN PATENT DOCUMENTS

| | | | |
|---|---|---|---|
| EP | 1335217 A2 | | 8/2003 |
| JP | 2005-513241 A | | 5/2005 |
| JP | 2007133299 A | * | 5/2007 |
| JP | 2008-505369 A | | 2/2008 |
| JP | 2008-52078 A | | 3/2008 |
| JP | 2008-512504 A | | 4/2008 |
| JP | 2008-225180 A | | 9/2008 |
| JP | 2009-186785 A | | 8/2009 |

OTHER PUBLICATIONS

Englsh translation for JP 2007-133299 by computer, http://www4.ipdl.inpit.go.jp/Tokujitu/PAJdetail.ipdl?N0000=60&N0120=01&N2001=2&N3001=2007-133299.*
Supplementary European Search Report, mailed May 22, 2014, which issued during the prosecution of EP Patent Application No. 10743806.1, which corresponds to the present application.

* cited by examiner

Primary Examiner — Shean C Wu
(74) Attorney, Agent, or Firm — McDermott Will & Emery LLP

(57) ABSTRACT

The present invention provides a polymerizable liquid crystal composition containing polymerizable liquid crystal compounds and a photoinitiator, wherein the photoinitiator has a light absorption band in a wavelength range of 280 to 400 nm; and at least one of the polymerizable liquid crystal compounds has a light absorption band in a wavelength range of 320 to 400 nm or a light-absorbing agent having a light absorption band in a wavelength range of 280 to 400 nm is contained. Thus, there is provided a material that can be cured in the air without replacing the atmosphere with an inert gas during irradiation with ultraviolet rays and that can achieve the characteristics required for a biaxial film, such as a sufficiently large front phase difference.

25 Claims, 7 Drawing Sheets

POLYMERIZABLE LIQUID CRYSTAL COMPOSITION

CROSS REFERENCE TO PRIOR APPLICATIONS

This application is a U.S. National Phase application under 35 U.S.C. §371 of International Application No. PCT/JP2010/052438, filed on Feb. 18, 2010 and claims benefit of priority to Japanese Patent Application No. 2009-037781, filed on Feb. 20, 2009 and Japanese Patent Application No. 2009-061068, filed on Mar. 13, 2009. The International Application was published in Japanese on Aug. 26, 2010 as WO 2010/095680 A1 under PCT Article 21(2). The contents of these applications are hereby incorporated by reference.

TECHNICAL FIELD

The present invention relates to a polymerizable liquid crystal composition used for the production of optical compensation films such as liquid crystal displays.

BACKGROUND ART

The use of biaxial films composed of a polymerizable cholesteric material has been proposed as a useful technology for improving the performance of liquid crystal displays (refer to PTL 1 and PTL 2). Biaxial films can be produced by applying a polymerizable cholesteric liquid crystal containing a dichromatic initiator to a substrate and then performing polymerization with polarized UV. However, there is a problem in that it is difficult to formulate a dichromatic initiator because both dichromatism and performance of a polymerization initiator need to be achieved, and thus only limited materials can be used. Furthermore, it is extremely difficult to impart, to a dichromatic initiator, the performance of a photoinitiator that can achieve curing in the air (in the presence of oxygen), and thus the atmosphere needs to be replaced with an inert gas such as nitrogen during irradiation with polarized UV. This poses problems such as an increase in production cost, an increase in takt time, and a decrease in process margin.

Biaxial films can be produced with a typical polymerization initiator used in the technical field of photo-radical polymerization, instead of a dichromatic initiator. By selecting a photoinitiator that can achieve curing in the air, curing can be performed with polarized UV without replacing the atmosphere with an inert gas. However, this poses a problem in that the performance as a biaxial film is not sufficiently provided. For example, regarding biaxial films used for liquid crystal displays, particularly VA liquid crystal displays, it is difficult to ensure that the front phase difference Re (defined as Re=$(n_x-n_y) \times d$, where $n_x$ and $n_y$ represent refractive indices in a film in-plane direction, $n_z$ represents a refractive index in a thickness direction, and d represents a thickness) is 40 nm or more and the phase difference Rth in a thickness direction (defined as Rth=$((n_x+n_y)/2-n_z) \times d$, where $n_x$ and $n_y$ represent refractive indices in a film in-plane direction, $n_z$ represents a refractive index in a thickness direction, and d represents a thickness) is 180 nm or more.

To improve the front phase difference of biaxial films, a technology has been disclosed in which 5 to 60% of polymerizable liquid crystal compound having a carbon-carbon triple bond is added (refer to PTL 3). The front phase difference Re is only 8.5 nm when a compound having a carbon-carbon triple bond is not contained. In contrast, a front phase difference Re of 30 nm or more can be achieved with this technology. However, such a compound having a carbon-carbon triple bond has poor light resistance, which poses a problem in that a film formed by adding 5% or more of the compound easily turns yellow through exposure to light.

CITATION LIST

Patent Literature

PTL 1: Japanese Unexamined Patent Application Publication (Translation of PCT Application) No. 2005-513241

PTL 2: Japanese Unexamined Patent Application Publication (Translation of PCT Application) No. 2008-505369

PTL 3: Japanese Unexamined Patent Application Publication (Translation of PCT Application) No. 2008-512504

SUMMARY OF INVENTION

Technical Problem

Regarding a polymerizable liquid crystal composition used as a material for a biaxial film, an object of the present invention is to provide a material that can be cured in the air without replacing the atmosphere with an inert gas during the irradiation with ultraviolet rays and that can achieve the characteristics required for a biaxial film, such as a sufficiently large front phase difference.

Solution to Problem

As a result of intensive study performed to achieve the object above, it has been found that an initiator and a light-absorbing agent may be selected or an initiator and a liquid crystal material may be selected so as to satisfy certain conditions, and therefore the present invention has been completed.

The present invention provides a polymerizable liquid crystal composition containing polymerizable liquid crystal compounds and a photoinitiator, wherein the photoinitiator has a light absorption band in a wavelength range of 280 to 400 nm; and at least one of the polymerizable liquid crystal compounds has a light absorption band in a wavelength range of 320 to 400 nm and/or a light-absorbing agent having a light absorption band in a wavelength range of 280 to 400 nm is contained, and an optically anisotropic body obtained by curing the polymerizable liquid crystal composition.

Advantageous Effects of Invention

The polymerizable liquid crystal composition of the present invention can be polymerized in the air without using a dichromatic initiator by making the light absorption bands of the photoinitiator and light-absorbing agent match each other or by making the light absorption bands of the photoinitiator and at least one of the polymerizable liquid crystal compounds match each other. Thus, the front phase difference Re of the produced biaxial film can be increased. Furthermore, since there is no need to use a dichromatic initiator, a widely available polymerization initiator that allows curing in the air can be used. Regarding the polymerizable liquid crystal composition of the present invention, the atmosphere during UV curing need not necessarily be replaced with an inert gas. Therefore, the production process is simple, the degree of curing is not easily affected by residual oxygen, and a process margin in the production of biaxial films can be increased.

DESCRIPTION OF EMBODIMENTS

A photo-radical polymerization initiator is preferably used as the photoinitiator used for the polymerizable liquid crystal composition of the present invention. An optically isotropic initiator having no difference in light absorption between light vibration surfaces or a pleochroic initiator having a difference in light absorption between light vibration surfaces may be used as the photoinitiator. A typical dichromatic initiator may be used as the pleochroic initiator, but an optically isotropic initiator other than the pleochroic initiator is preferably used in terms of availability and the number of choices of initiators.

The photoinitiator has an absorption band in a wavelength range of 280 to 400 nm, preferably in a wavelength range of 300 to 390 nm, and particularly preferably in a wavelength range of 320 to 380 nm.

Specific examples of the chemical structure of the photoinitiator include benzoin ethers, benzophenones, acetophenones, benzyl ketals, acylphosphine oxides, and oxime esters.

Among them, oxime esters are preferably used. Specifically, a compound of the oxime esters preferably a compound having a structure represented by general formula (RI-1) or general formula (RI-2) below.

[Chem. 1]

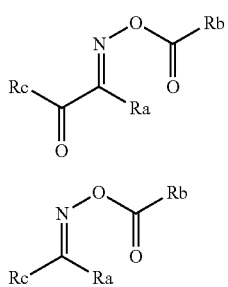

(RI-1)

(RI-2)

(In the formulae, Ra, Rb, Rc, and Rd each independently represent R, RO, RCO, RS, RR'NCO, or CN; R and R' each independently represent an alkyl group, aryl group, aralkyl group, cycloalkyl aromatic ring, or heterocyclic group having 20 or less carbon atoms; these substituents may be further substituted with a halogen atom or a similar substituent; and the carbon atom in the group may be substituted with an oxygen atom or a sulfur atom.)

More specifically, the general formula (RI-1) or the general formula (RI-2) is preferably general formula (RI-1a) or general formula (RI-2a).

[Chem. 2]

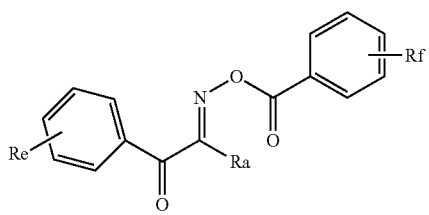

(RI-1a)

(In the formula, Ra represents an alkyl group, aryl group, aralkyl group, or aromatic ring having 20 or less carbon atoms; Re and Rf each independently represent R, RO, RCO, RS, RR'NCO, or CN; and R and R' each independently represent an alkyl group, aryl group, aralkyl group, cycloalkyl aromatic ring, or heterocyclic group having 20 or less carbon atoms.)

[Chem. 3]

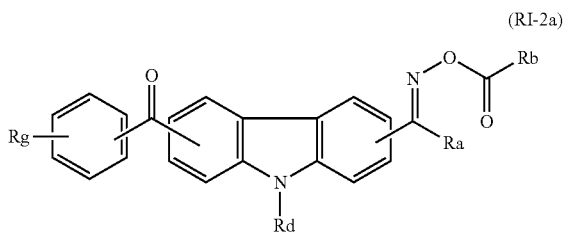

(RI-2a)

(In the formula, Ra, Rb, Rd, and Rg each independently represent an alkyl group, aryl group, aralkyl group, or aromatic ring having 20 or less carbon atoms.)

More specific examples of the compound of the oxime esters include "Irgacure OXE 01" and "Irgacure OXE 02" (manufactured by Ciba Specialty Chemicals.)

Acylphosphine oxides are also preferably used as the photoinitiator. Specifically, such a compound is preferably represented by general formula (RI-3).

[Chem. 4]

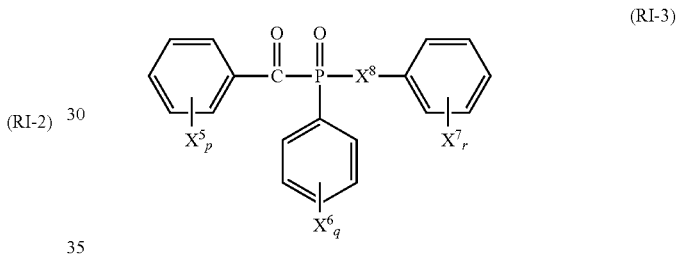

(RI-3)

(In the formula, $X^5$ to $X^7$ each independently represent an alkyl group, aryl group, aralkyl group, or aromatic ring having 20 or less carbon atoms; p, q, and r each independently represent an integer of 1 to 4; and $X^8$ represents a single bond or —CO—.)

More specifically, formula (RI-3a) and formula (RI-3b) can be exemplified.

[Chem. 5]

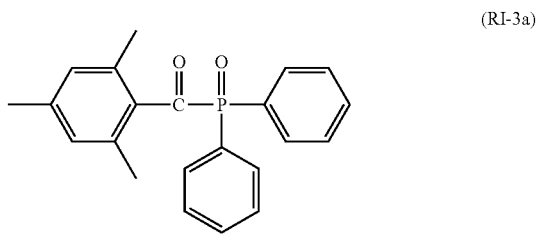

(RI-3a)

[Chem. 6]

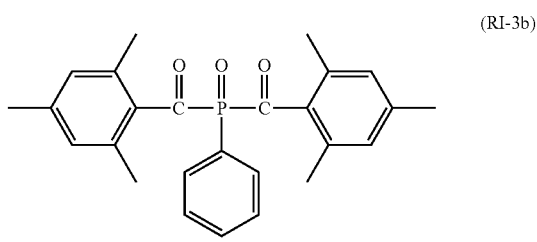

(RI-3b)

Examples of the product name of the compound of the acylphosphine oxides include "Irgacure-819" (manufactured by Ciba Specialty Chemicals) and "Lucirin TPO" (manufactured by BASF).

At least one of the oxime esters and the acylphosphine oxides is preferably contained. These compounds are useful because many of them have an absorption band in a wavelength range of 320 to 380 nm. To control and improve ultraviolet curing characteristics, it is exceedingly effective to use a photoinitiator having an absorption band mainly in a wavelength range of 280 to 320 nm together with the above-described photoinitiator having an absorption band in a wavelength range of 320 to 380 nm. In this application, "Irgacure-907" and "Irgacure-2959" (manufactured by Ciba Specialty Chemicals) can be used. In this case, a combination of the oxime ester with "Irgacure-907" and a combination of the acylphosphine oxide and "Irgacure-907" can be preferably exemplified.

Other examples of the photoinitiator having an absorption band in a wavelength range of 280 to 400 nm include "Irgacure-651", "Irgacure-184", "Darocur-1173", "Irgacure-127", "Darocur MBF", "Irgacure-369", and "Irgacure-379".

The polymerizable liquid crystal composition is preferably cured in the air at an ultraviolet dose of 4000 mJ/cm² or less, more preferably at 2000 mJ/cm² or less, and particularly preferably at 1000 mJ/cm² or less.

The amount of the polymerization initiator added to the polymerizable liquid crystal composition is preferably 1 to 6%, more preferably 1 to 5%, and particularly preferably 3 to 5%. If the amount added is small, the curing characteristic is degraded. If the amount added is large, the properties of liquid crystal in the polymerizable liquid crystal composition are easily impaired.

In the present invention, a polymerizable liquid crystal compound having a light absorption band in a wavelength range of 320 to 400 nm or a light-absorbing agent having a light absorption band in a wavelength range of 280 to 400 nm is contained.

The light-absorbing agent contained in the polymerizable liquid crystal composition of the present invention has an absorption band in a wavelength range of 280 to 400 nm, preferably has an absorption band in a wavelength range of 300 to 390 nm, and particularly preferably has an absorption band in a wavelength range of 320 to 380 nm. Specifically, the light-absorbing agent preferably has a double bond in its molecule. A carbon-carbon double bond or a carbon-nitrogen double bond is preferred as the double bond. The molecule preferably has good linearity. This light-absorbing agent may exhibit liquid crystallinity, but does not necessarily exhibit liquid crystallinity.

Specifically, the light-absorbing agent is preferably a compound represented by general formula (X)

[Chem. 7]

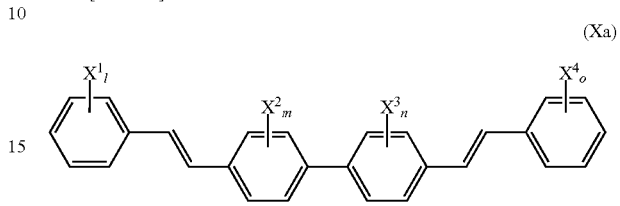

(X)

(in the formula, $X^1$ to $X^4$ each independently represent a fluorine atom, an alkyl group, alkoxy group, acyl group, or alkoxycarboxy group having 1 to 18 carbon atoms, or an alkenyl group or alkenyloxy group having 2 to 18 carbon atoms; l and o each independently represent an integer of 1 to 5; m and n each independently represent an integer of 1 to 4; and $L^1$ to $L^3$ each independently represent a single bond or —CH=CH—, but at least two of $L^1$ to $L^3$ represent —CH=CH—), more preferably a compound represented by general formula (Xa)

[Chem. 8]

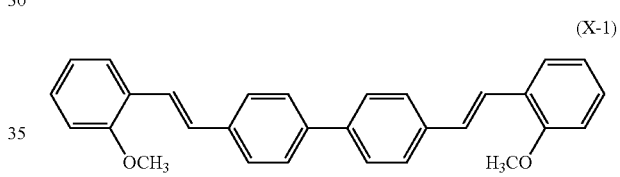

(Xa)

(in the formula, $X^1$ to $X^4$ each independently represent a fluorine atom, an alkyl group, alkoxy group, acyl group, or alkoxycarboxy group having 1 to 18 carbon atoms, or an alkenyl group or alkenyloxy group having 2 to 18 carbon atoms; l and o each independently represent an integer of 1 to 5; and m and n each independently represent an integer of 1 to 4), and particularly preferably a compound represented by formula (X1).

[Chem. 9]

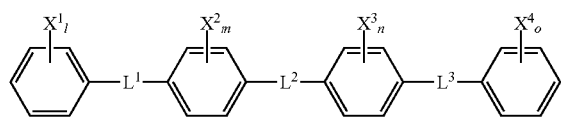

(X-1)

FIG. 1 shows a spectrum obtained when this compound is dissolved in acetonitrile in a concentration of 10 ppm and measurement is performed with an optical path length of 1 cm. It is clear that this compound has an absorption band (absorption peak) at about 360 nm.

The amount of the light-absorbing agent added is preferably 0.1 to 4%, more preferably 0.2 to 3%, and particularly preferably 0.3 to 2%.

The absorption bands of the photoinitiator and the light-absorbing agent preferably match each other between 280 nm and 400 nm. The difference in peak wavelength is preferably within 30 nm, more preferably within 20 nm, and particularly preferably within 10 nm.

In an aspect of the present invention in which polymerizable liquid crystal compounds having a light absorption band in a wavelength range of 320 to 400 nm are contained, at least one of the polymerizable liquid crystal compounds preferably has an absorption band in a wavelength range of 320 to 390 nm and particularly preferably has an absorption band in a wavelength range of 320 to 380 nm. Specifically, the polymerizable liquid crystal compound preferably has a double bond in its molecule. A carbon-carbon double bond, a carbon-nitrogen double bond, or a nitrogen-nitrogen double bond is preferred as the double bond. The polymerizable liquid crystal compound is preferably a compound represented by general formula (I).

[Chem. 10]

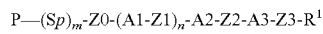

(I)

(In the formula, Sp represents an alkylene group having 1 to 20 carbon atoms (the alkylene group may be substituted with at least one halogen atom or CN, and, in the alkylene group, a CH$_2$ group or two or more CH$_2$ groups that are not adjacent to each other may be each independently substituted with —O—, —S—, —NH—, —N(CH$_3$)—, —CO—, —COO—, —OCO—, —OCOO—, —SCO—, —COS—, or —C≡C— without directly bonding oxygen atoms with each other);

A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a fluorene-2,7-diyl group, or formula (I-b-1), formula (I-b-2), or formula (I-b-3);

[Chem. 11]

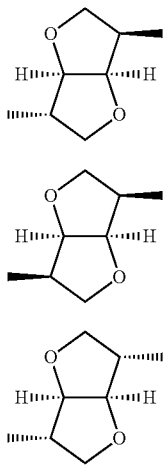

(I-b-1)

(I-b-2)

(I-b-3)

the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may have, as a substituent, at least one F, Cl, CF$_3$, OCF$_3$, cyano group, alkyl group, alkoxy group, alkanoyl group, or alkanoyloxy group having 1 to 8 carbon atoms, or alkenyl group, alkenyloxy group, alkenoyl group, or alkenoyloxy group having 2 to 8 carbon atoms;

Z0, Z1, Z2, and Z3 each independently represent —COO—, —COO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, —CH=N—, —N=CH—, —N=N—, —CH=N—N=CH—, or a single bond, and at least one of Z0, Z1, and Z2 represents —CH=CH—, —CH=CHCOO—, —OCOCH=CH—, —CH=N—, —N=CH—, —N=N—, or —CH=N—N=CH—;

m represents 0 or 1 and n represents 0, 1, 2, or 3;

P represents a substituent selected from the group consisting of substituents represented by general formula (I-c) and general formula (I-d)

[Chem. 12]

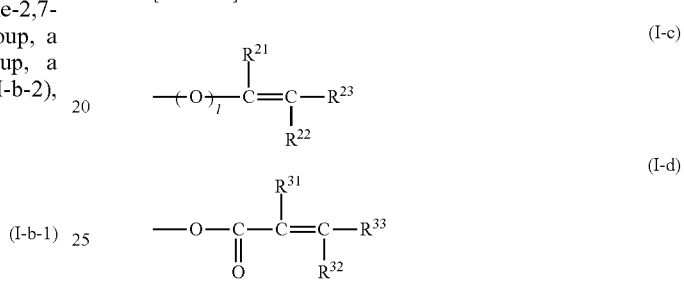

(I-c)

(I-d)

(in the formulae, R$^{21}$, R$^{22}$, R$^{23}$, R$^{31}$, R$^{32}$, and R$^{33}$ each independently represent a hydrogen atom, a halogen atom, or an alkyl group having 1 to 5 carbon atoms, and l represents 0 or 1); and R$^1$ represents a halogen atom, a cyano group, or an alkyl group having 1 to 25 carbon atoms, and the alkyl group may be substituted with at least one halogen atom or CN, and, in the alkyl group, a CH$_2$ group or two or more CH$_2$ groups that are not adjacent to each other may be each independently substituted with —O—, —S—, —NH—, —N(CH$_3$)—, —CO—, —COO—, —OCO—, —OCOO—, —SCO—, —COS—, or —C≡C— without directly bonding oxygen atoms with each other, or R$^1$ represents a structure represented by general formula (I-a)

[Chem. 13]

-(Sp)$_m$—P        (I-a)

(in the formula, P, Sp, and m have the same meaning as those in the general formula (I), but the two P, the two Sp, and the two m may be the same or different from each other).)

Among the compounds represented by the general formula (I), a compound represented by general formula (II) is preferably contained as a compound having a single polymerizable functional group

[Chem. 14]

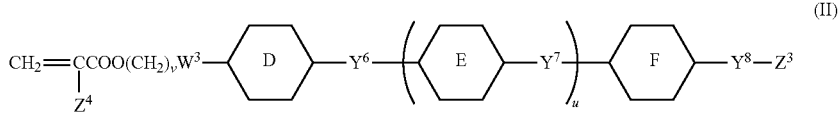

(II)

(in the formula, Z$^3$ represents a hydrogen atom, a halogen atom, a cyano group, or a hydrocarbon group having 1 to 20 carbon atoms; Z$^4$ represents a hydrogen atom or a methyl group; $W^3$ represents a single bond, —O—, —COO—, or —OCO—; v represents an integer of 0 to 18; u represents 0 or 1; D, E, and F each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; $Y^6$ and $Y^7$ each independently represent a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2CH$=CH—, —CH=CHCOO—, —OCOCH=CH—, —$CH_2CH_2COO$—, —$CH_2CH_2OCO$—, —$COOCH_2CH_2$—, —$OCOCH_2CH_2$—, —CH=N—, —N=CH—, —N=N—, or —CH=N—N=CH—, and at least one of $Y^6$ and $Y^7$ represents —CH=CH—, —CH=CHCOO—, 13 OCOCH=CH—, —CH=N—, —N=CH—, —N=N—, or —CH=N—N=CH—;
$Y^8$ represents a single bond, —O—, —COO—, —COO—, or —CH=—CH=CHCOO—; and v represents an integer of 2 to 18 if $W^3$ represents a single bond).

The compound represented by the general formula (II) contains a compound having a spacer between a liquid crystal skeleton and a polymerizable functional group and a compound having no spacer. In the general formula (II), the case where $W^3$ represents a substituent other than a single bond and v represents an integer of 2 to 18 corresponds to the compound having a spacer. Specifically, the following compounds represented by general formulae (II-1) to (II-7) are preferred.

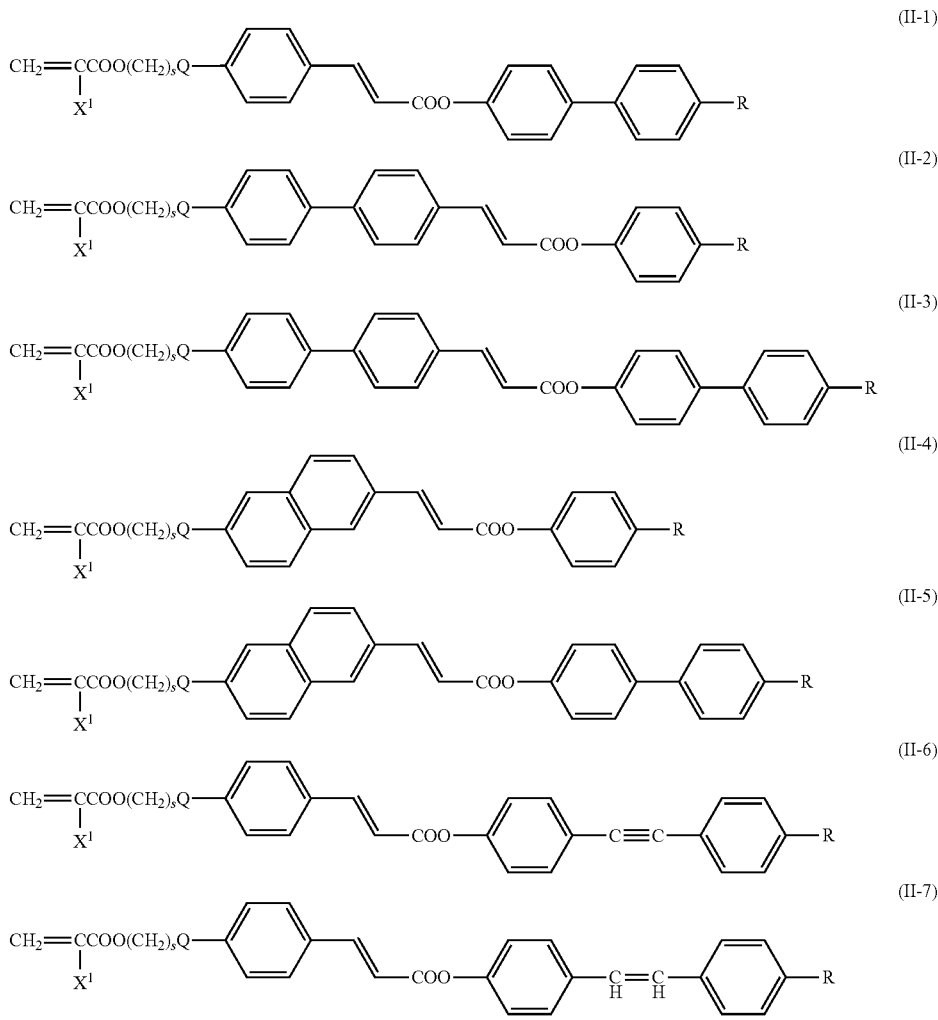

(In the formulae, $X^1$ represents a hydrogen atom or a methyl group; R represents an alkyl group or alkoxy group having 1 to 20 carbon atoms, a cyano group, or a fluorine atom; S represents an integer of 2 to 8; and Q represents an oxygen atom or a single bond.) $X^1$ is preferably a hydrogen atom, and S is preferably 2, 3, 4, or 6.

Among the compounds represented by the general formula (I), a compound represented by general formula (III) is preferred as a compound having two polymerizable functional groups.

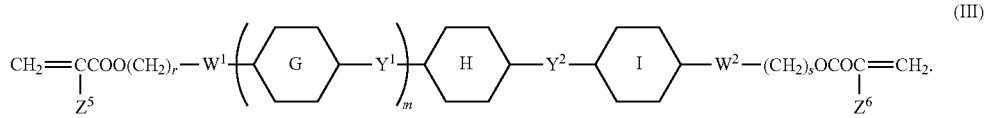

(III)

(In the formula, $Z^5$ and $Z^6$ each independently represent a hydrogen atom or a methyl group; G, H, and I each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; m represents an integer of 0 to 3; $W^1$ and $W^2$ each independently represent a single bond, —O—, —COO—, or —OCO—; $Y^1$ and $Y^2$ each independently represent —COO—, —OCO—, —$CH_2CH_2$COO—, —$CH_2CH_2$OCO—, —COO$CH_2CH_2$—, —OCO$CH_2CH_2$—, —CH=N—, —N=CH—, —N=N—, —CH=N—N=CH—, or a single bond, and at least one of $Y^1$ and $Y^2$ represents —CH=CH—, —CH=CHCOO—, —OCOCH=CH—, —CH=N—, —N=CH—, —N=N—, or —CH=N—N=CH—; r and s each independently represent an integer of 2 to 18; and the 1,4-phenylene group in the formula may be substituted with at least one alkyl group, alkoxy group, or alkanoyl group having 1 to 7 carbon atoms, cyano group, or halogen atom.)

More specifically, the following compounds can be exemplified.

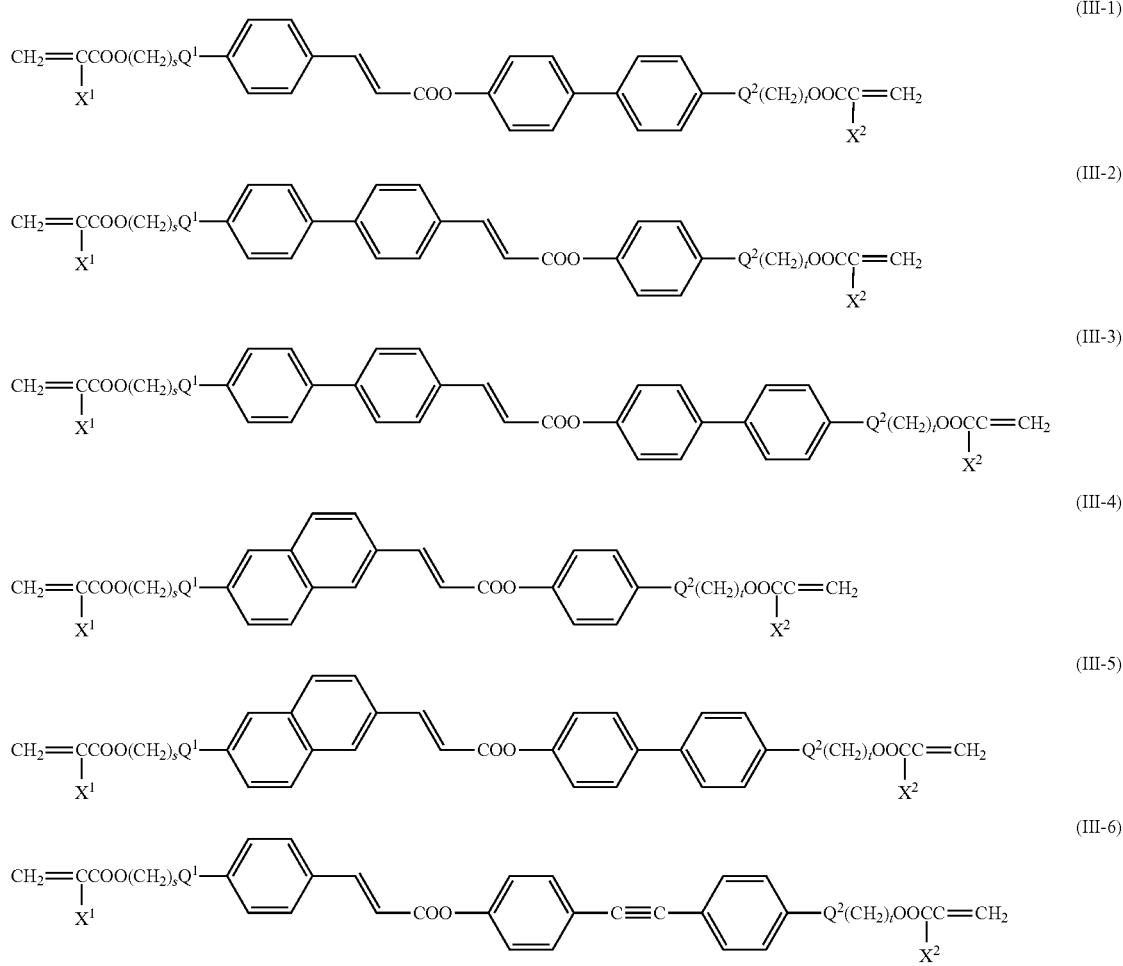

(III-7)
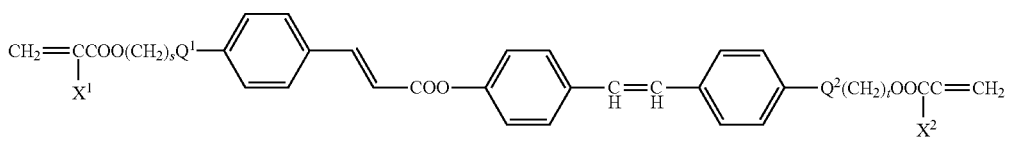

(III-8)
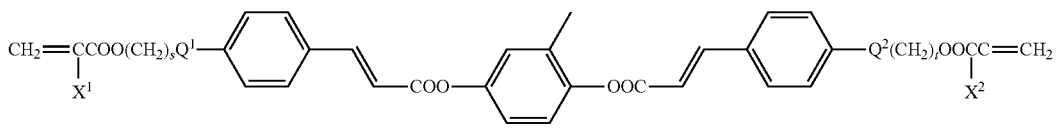

(III-9)
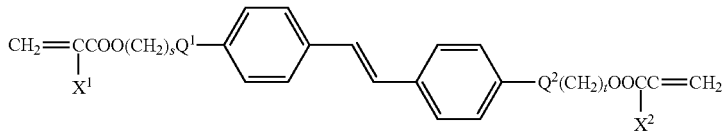

(III-10)
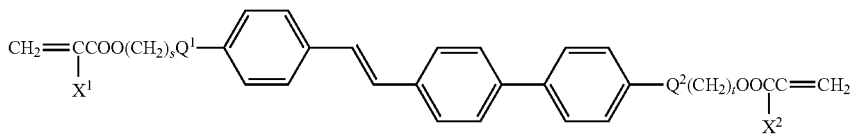

(III-11)
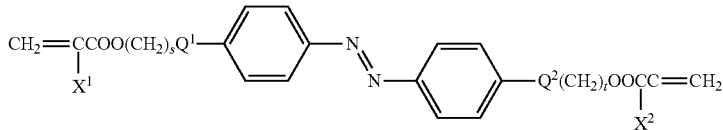

(III-12)
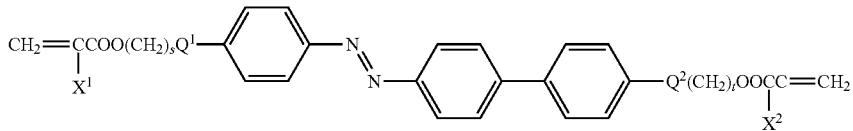

(III-13)
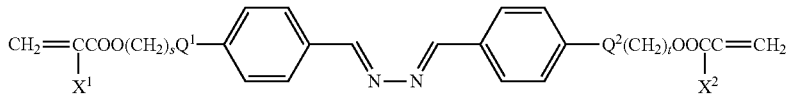

(In the formulae, $X^1$ and $X^2$ each independently represent a hydrogen atom or a methyl group; $Q^1$ and $Q^2$ each independently represent an oxygen atom or a single bond; and s and t each independently represent an integer of 2 to 18.) $X^1$ and $X^2$ are preferably a hydrogen atom, and s and t are each independently preferably 2, 3, 4, or 6.

Among the compounds represented by the general formula (I), compounds represented by formulae (a) and (b) are preferred as a compound having an isosorbide skeleton.

[Chem. 18]

(a)
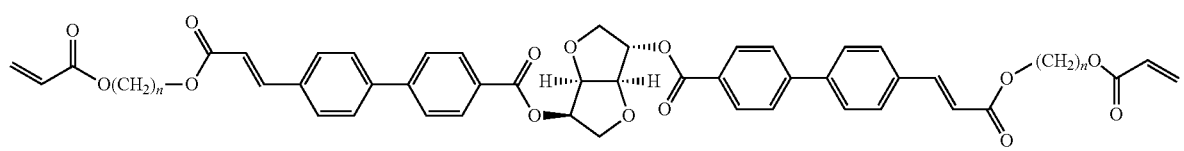

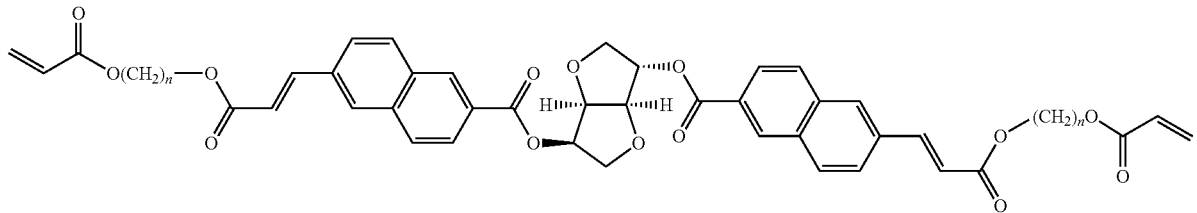
(b)

The addition of these compounds can also provide advantages achieved by addition of chiral compounds. The chiral compounds represented by the general formula (I) may be used alone or in combination. The total concentration C (mass %) is preferably 0.1 to 4%, more preferably 0.2 to 3%, and particularly preferably 0.3 to 2%. In the determination of the concentration, it is important to achieve a certain absorbance at an absorption band of 320 to 400 nm, preferably 320 to 390 nm, and particularly preferably 320 to 380 nm.

Herein, absorbance $A_{100}$ is defined as in the following calculation formula 1. An absorbance obtained by measuring a polymerizable liquid crystal compound in an acetonitrile solvent using a cell having an optical path length of 1 cm is defined as Ac. An absorbance obtained by dividing the absorbance Ac by the concentration $C_1$ (mass %) during the measurement and then multiplying the result by 100, that is, an absorbance per 100 mass % is defined as $A_{100}$.

[Math. 1]

$$A_{100}=Ac/C_1\times 100 \qquad \text{Calculation Formula 1}$$

The polymerizable liquid crystal material preferably has an absorbance A of 100 to 4000 at the above-described absorption band, more preferably 200 to 3000, and particularly preferably 300 to 2500.

The preferred amount, of the compound represented by the general formula (I), practically added is calculated from the following calculation formula 2.

[Math. 2]

$$C=A/A_{100}\times 100 \qquad \text{Calculation Formula 2}$$

For example, a compound represented by formula (III-2a) shows a spectrum of FIG. 2 (20 ppm in acetonitrile, optical path length: 1 cm).

the present invention is, for example, only the compound represented by the formula (III-2a), it is found from the calculation formula 2 that 2.72% of the compound represented by the formula (III-2a) needs to be added as a polymerizable liquid crystal material to achieve an absorbance A of 2000.

The absorbance $A_{100}$ (obtained by measuring an absorbance of a compound dissolved in acetonitrile at an optical path length of 1 cm and then performing calculation from the concentration during the measurement) of the polymerizable liquid crystal compound alone represented by the general formula (I) is preferably 30000 or more, more preferably 45000 or more, and particularly preferably 60000 or more.

The absorption bands of the photoinitiator and the light-absorbing agent preferably match each other between 320 nm and 400 nm. The difference in peak wavelength is preferably within 30 nm, more preferably within 20 nm, and particularly preferably within 10 nm.

In the present invention, when a light-absorbing agent having a light absorption band in a wavelength range of 280 to 400 nm is contained, the compound represented by the general formula (I) is not necessarily contained. A polymerizable liquid crystal compound other than the compound represented by the general formula (I) is preferably a compound represented by general formula (IV).

[Chem. 20]

$$P^1-(Sp^1)_o-Z4-(A4-Z5)_q-A5-Z6-A6-Z7-R^2 \qquad (IV)$$

(In the formula, $Sp^1$ represents an alkylene group having 1 to 20 carbon atoms (the alkylene group may be substituted with at least one halogen atom or CN, and, in the alkylene group, a $CH_2$ group or two or more $CH_2$ groups that are not adjacent to each other may be each independently substituted with —O—, —S—, —NH—, —N(CH$_3$)—, —CO—, —COO—,

[Chem. 19]

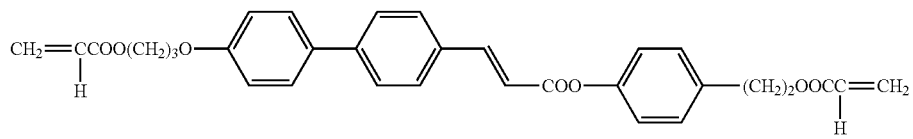
(III-2a)

The absorbance Ac of this compound is obtained by dissolving the compound in an acetonitrile solvent in a concentration of 20 ppm and performing measurement at an optical path length of 1 cm. It is clear from FIG. 2 that the absorption peak is present at 327 nm and the absorbance at that wavelength is 1.47. Thus, from the calculation formula 1, the absorbance $A_{100}$ per 100 mass % of the compound represented by the formula (III-2a) is calculated to be 73500. As a result, in the case where the compound represented by the formula (I) and contained in the polymerizable liquid crystal composition of —OCO—, —OCOO—, —SCO—, —COS—, or —C≡C— without directly bonding oxygen atoms with each other);

A4, A5, and A6 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7- diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may have, as a substituent, at least one F, Cl, $CF_3$, $OCF_3$, cyano group, alkyl group, alkoxy group, alkanoyl group, or alkanoyloxy group having 1 to B carbon atoms, or alkenyl group, alkenyloxy group, alkenoyl group, or alkanoyloxy group having 2 to 8 carbon atoms;

Z4, Z5, Z6, and Z7 each independently represent —COO—, —OCO—, —$CH_2CH_2$—, —$OCH_2$—, —$CH_2O$—, —C≡C—, —$CH_2CH_2$COO—, —$CH_2CH_2$OCO—, —COO$CH_2CH_2$—, —OCO$CH_2CH_2$—, —CONH—, —NHCO—, or a single bond;

o represents 0 or 1;

q represents 0, 1, 2, or 3;

$P^1$ represents a substituent selected from the group consisting of substituents represented by general formula (IV-c) and general formula (IV-d)

[Chem. 21]

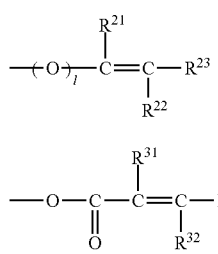

(IV-c)

(IV-d)

(in the formula, $R^{21}$, $R^{22}$, $R^{23}$, $R^{31}$, $R^{32}$, and $R^{33}$ each independently represent a hydrogen atom, a halogen atom, or an alkyl group having 1 to 5 carbon atoms, and l represents 0 or 1); and $R^2$ represents a halogen atom, a cyano group, or an alkyl group having 1 to 25 carbon atoms, and the alkyl group may be substituted with at least one halogen atom or CN, and, in the alkyl group, a $CH_2$ group or two or more $CH_2$ groups that are not adjacent to each other may be each independently substituted with —O—, —S—, —NH—, —N($CH_3$)—, —CO—, —COO—, —OCO—, —OCOO—, —SCO—, —COS—, or —C≡C— without directly bonding oxygen atoms with each other, or $R^2$ represents a structure represented by general formula (IV-a)

[Chem. 22]

$$-(Sp^1)_o—P^1 \quad (IV\text{-}a)$$

(in the formula, $P^1$, $Sp^1$, and o have the same meaning as those in the general formula (IV), but the two $P^1$, the two $Sp^1$, and the two o may be the same or different from each other).)

Among the compounds represented by the general formula (IV), a compound represented by general formula (V) is preferably contained as a compound having a single polymerizable functional group

[Chem. 23]

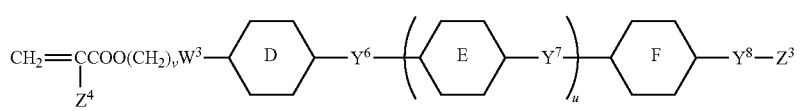

(V)

(in the formula, $Z^3$ represents a hydrogen atom, a halogen atom, a cyano group, or a hydrocarbon group having 1 to 20 carbon atoms; $Z^4$ represents a hydrogen atom or a methyl group; $W^3$ represents a single bond, —O—, —COO—, or —OCO—; v represents an integer of 0 to 18; u represents 0 or 1; D, E, and F each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; $Y^6$ and $Y^7$ each independently represent a single bond, —$CH_2CH_2$—, —$CH_2O$—, —$OCH_2$—, —COO—, —OCO—, —C≡C—, —$(CH_2)_4$—, —$CH_2CH_2CH_2O$—, —$OCH_2CH_2CH_2$—, $CH_2CH_2$COO—, —$CH_2CH_2$OCO—, —COO$CH_2CH_2$—, or —OCO$CH_2CH_2$—; $Y^B$ represents a single bond, —O—, —COO—, or —OCO—; and v represents an integer of 2 to 18 if $W^3$ represents a single bond).

The compound represented by the general formula (V) is useful because it decreases the lower limit temperature of a liquid crystal state. The amount of the compound added is preferably 5 to 60%, more preferably 10 to 50%, and particularly preferably 15 to 40%. If the amount is large, the heat resistance of the biaxial film obtained tends to be impaired.

The compound represented by the general formula (V) contains a compound having a spacer between a liquid crystal skeleton and a polymerizable functional group and a compound having no spacer. In the general formula (V), the case where $W^3$ represents a substituent other than a single bond and v represents an integer of 2 to 18 corresponds to the compound having a spacer. Specifically, the following compounds represented by general formulae (V-1) to (V-9) are preferred.

[Chem. 24]

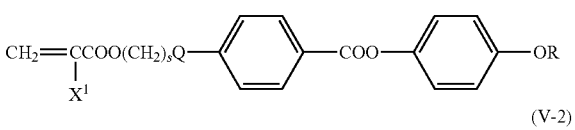

(V-1)

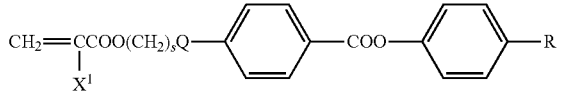

(V-2)

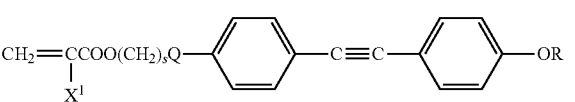

(V-3)

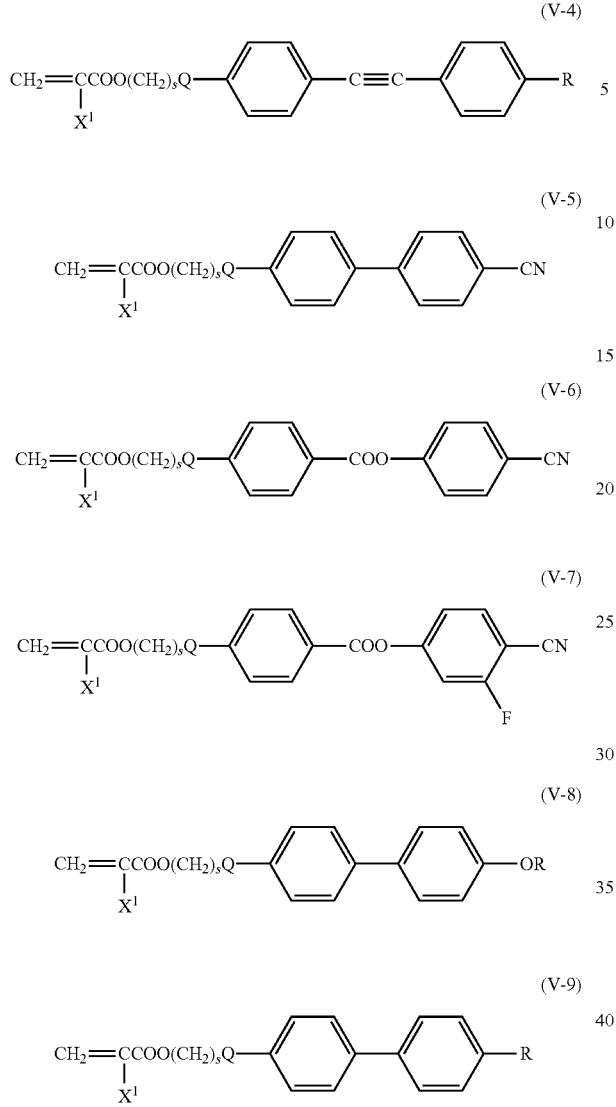

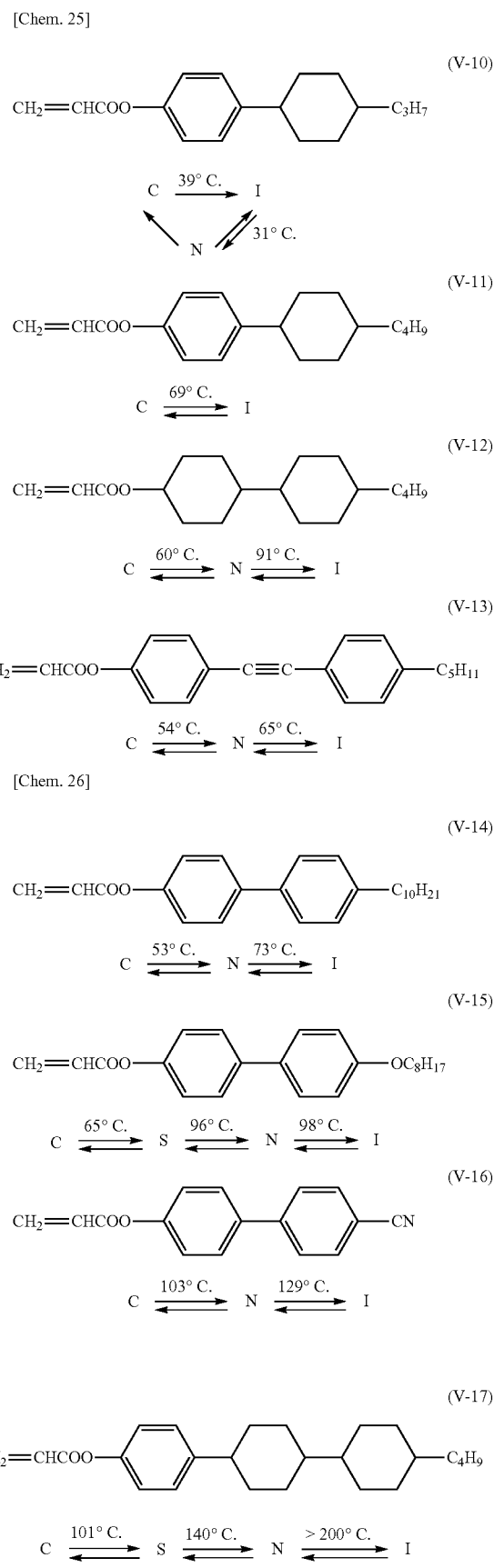

(In the formulae, $X^1$ represents a hydrogen atom or a methyl group and R represents an alkyl group having 1 to 20 carbon atoms.) $X^1$ is preferably a hydrogen atom, and S is preferably 2, 3, 4, or 6. Among these compounds, the compounds represented by the formulae (V-5), (V-1), and (V-6) are preferred. In the case of the compound represented by the formula (V-1), R is particularly preferably a methyl group. To increase the front phase difference, the compound represented by the formula (V-5) is particularly preferred. In this case, $X^1$ is preferably H, Q is preferably an oxygen atom, and s is preferably 3, 4, or 6 and most preferably 6. The content of such a compound, particularly the compound represented by the formula (V-5), is preferably 10% or more, more preferably 15% or more, and particularly preferably 20% or more. However, if the content is 30% or more, the heat resistance and reliability of an optically anisotropic body obtained tend to be degraded. Therefore, the content is preferably 30% at most.

In the general formula (V), the case where $W^3$ represents a single bond and v represents 0 corresponds to the compound having no spacer. Specifically, compounds having structures below are preferred.

(V-18)

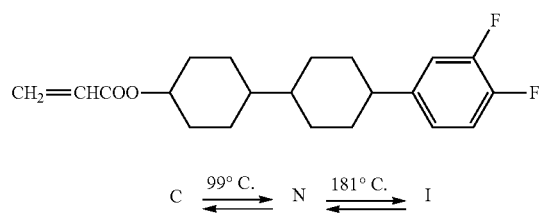

$$C \underset{\longleftarrow}{\overset{99°\ C.}{\longrightarrow}} N \underset{\longleftarrow}{\overset{181°\ C.}{\longrightarrow}} I$$

(V-19)

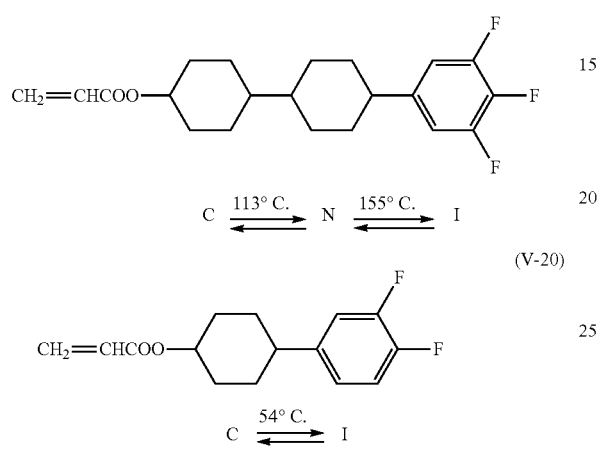

$$C \underset{\longleftarrow}{\overset{113°\ C.}{\longrightarrow}} N \underset{\longleftarrow}{\overset{155°\ C.}{\longrightarrow}} I$$

(V-20)

$$C \underset{\longleftarrow}{\overset{54°\ C.}{\longrightarrow}} I$$

(V-21)

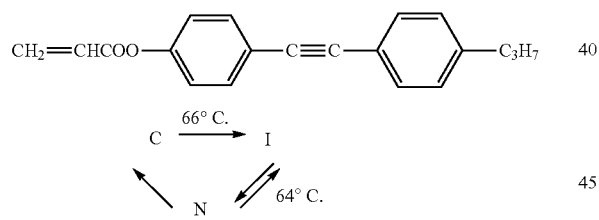

$$C \underset{\longleftarrow}{\overset{41°\ C.}{\longrightarrow}} N \underset{\longleftarrow}{\overset{49°\ C.}{\longrightarrow}} I$$

(V-22)

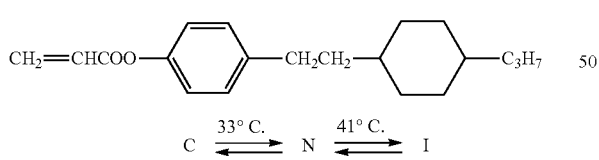

$$C \overset{66°\ C.}{\longrightarrow} I$$

$$N \underset{\longleftarrow}{\overset{64°\ C.}{\longrightarrow}}$$

(V-23)

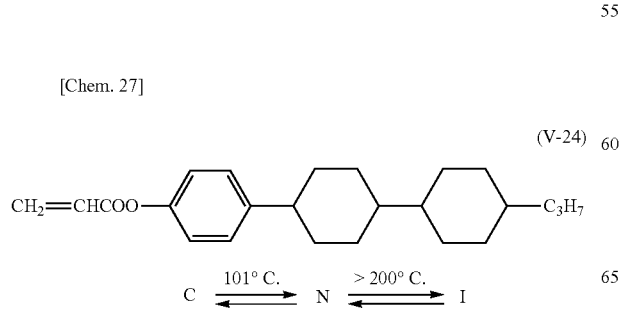

$$C \underset{\longleftarrow}{\overset{33°\ C.}{\longrightarrow}} N \underset{\longleftarrow}{\overset{41°\ C.}{\longrightarrow}} I$$

[Chem. 27]

(V-24)

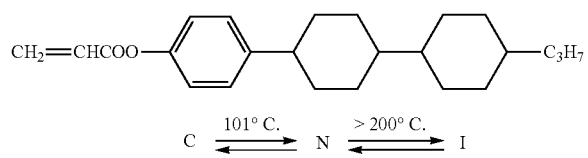

$$C \underset{\longleftarrow}{\overset{101°\ C.}{\longrightarrow}} N \underset{\longleftarrow}{\overset{>200°\ C.}{\longrightarrow}} I$$

(V-25)

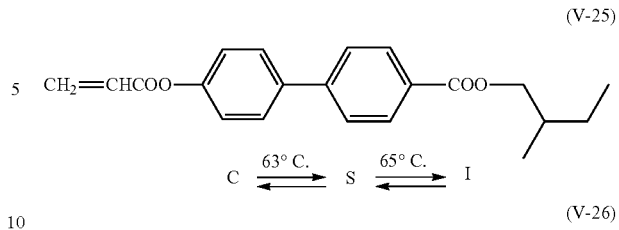

$$C \underset{\longleftarrow}{\overset{63°\ C.}{\longrightarrow}} S \underset{\longleftarrow}{\overset{65°\ C.}{\longrightarrow}} I$$

(V-26)

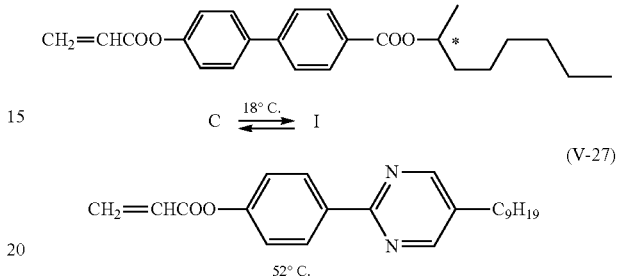

$$C \underset{\longleftarrow}{\overset{18°\ C.}{\longrightarrow}} I$$

(V-27)

$$C \underset{\longleftarrow}{\overset{52°\ C.}{\longrightarrow}} I$$

$$S_A \underset{\longleftarrow}{\overset{51°\ C.}{\longrightarrow}}$$

(V-28)

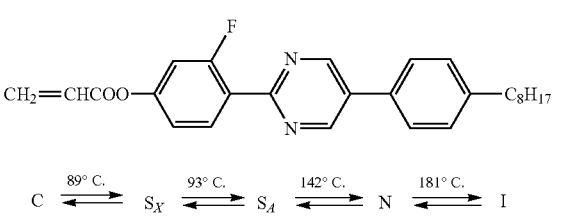

$$C \underset{\longleftarrow}{\overset{89°\ C.}{\longrightarrow}} S_X \underset{\longleftarrow}{\overset{93°\ C.}{\longrightarrow}} S_A \underset{\longleftarrow}{\overset{142°\ C.}{\longrightarrow}} N \underset{\longleftarrow}{\overset{181°\ C.}{\longrightarrow}} I$$

(V-29)

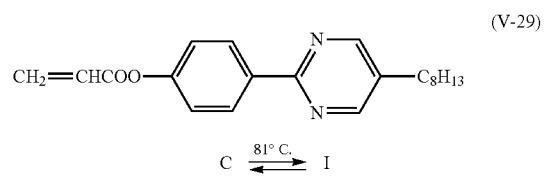

$$C \underset{\longleftarrow}{\overset{81°\ C.}{\longrightarrow}} I$$

(V-30)

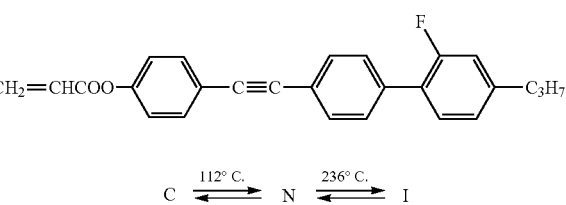

$$C \underset{\longleftarrow}{\overset{112°\ C.}{\longrightarrow}} N \underset{\longleftarrow}{\overset{236°\ C.}{\longrightarrow}} I$$

(V-31)

$$C \underset{\longleftarrow}{\overset{49°\ C.}{\longrightarrow}} I$$

(V-32)

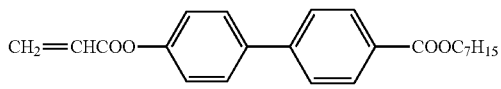

(V-33)

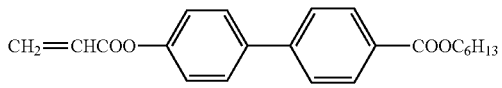

(V-34)

(In the formulae, a cyclohexane ring represents a trans-cyclohexane ring, the number indicates a phase transition temperature, and C, N, S, and I respectively represent a crystal phase, a nematic phase, a smectic phase, and an isotropic liquid phase.)

Among the compounds represented by the general formula (IV), a compound represented by general formula (VI) is preferred as a compound having two polymerizable functional groups

[Chem. 28]

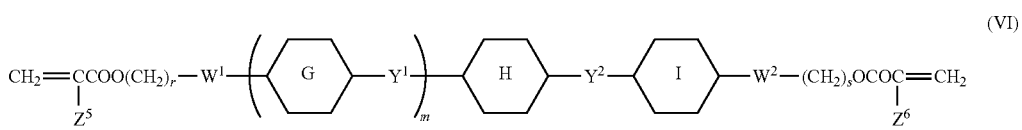

(VI)

(in the formula, $Z^5$ and $Z^6$ each independently represent a hydrogen atom or a methyl group; G, H, and I each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; m represents an integer of 0 to 3; $W^1$ and $W^2$ each independently represent a single bond, —O—, —COO—, or —OCO—; $Y^1$ and $Y^2$ each independently represent a single bond, —COO—, —OCO—, —CH$_2$CH$_2$COO—, —CH$_2$CH$_2$OCO—, —COOCH$_2$CH$_2$—, or —OCOCH$_2$CH$_2$—; r and s each independently represent an integer of 2 to 18; and the 1,4-phenylene group in the formula may be substituted with at least one alkyl group, alkoxy group, or alkanoyl group having 1 to 7 carbon atoms, cyano group, or halogen atom).

The compound represented by the general formula (VI) is effectively used to achieve high heat resistance in the form of a film. The amount of the compound added is preferably 30 to 85%, more preferably 40 to 80%, and particularly preferably 50 to 75%.

More specifically, the following compounds can be exemplified.

[Chem. 29]

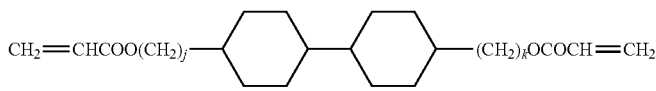

(VI-1)

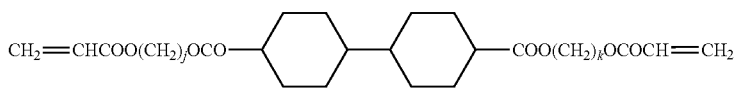

(VI-2)

-continued
(VI-3)
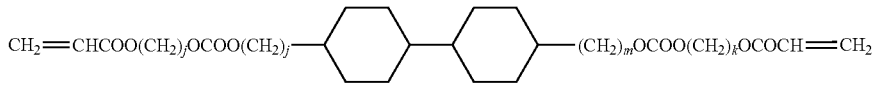
(VI-4)
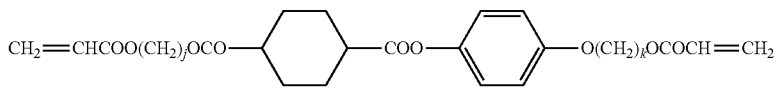
(VI-5)
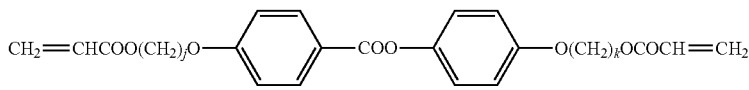
(VI-6)
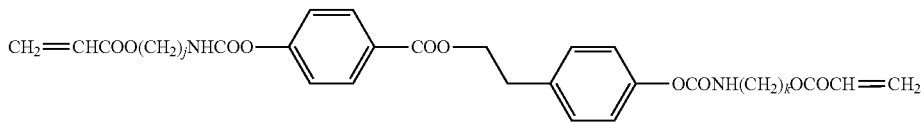
(VI-7)
(VI-8)
(VI-9)
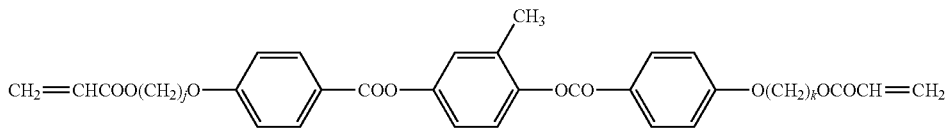
(VI-10)
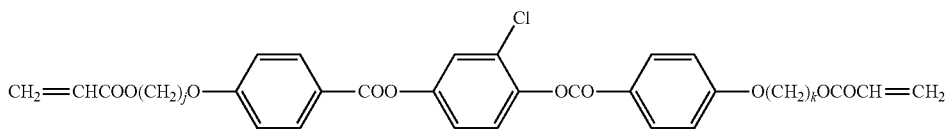
(VI-11)
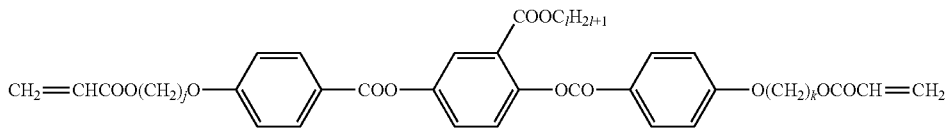
(VI-12)
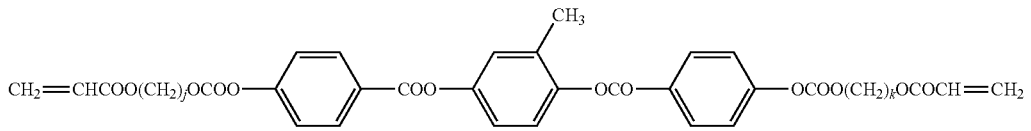
(VI-13)
(VI-14)
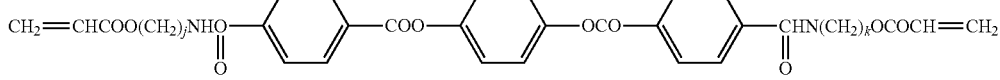

(VI-15)
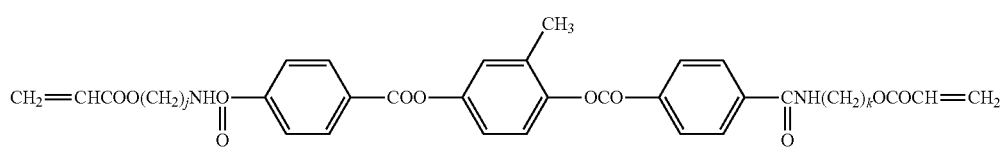
(VI-16)
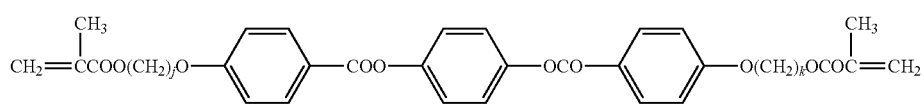
(VI-17)
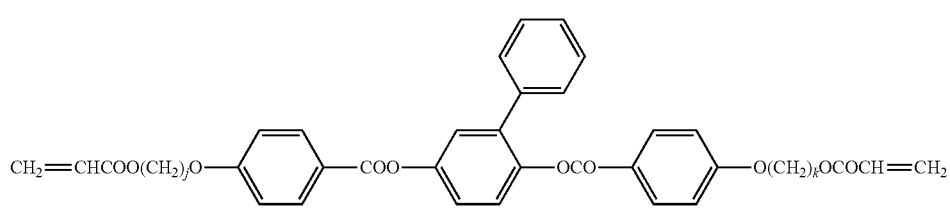
(VI-18)
(VI-19)
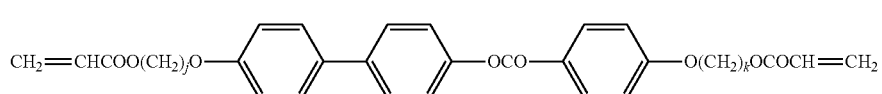
(VI-20)
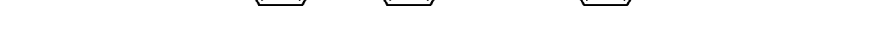
(VI-21)
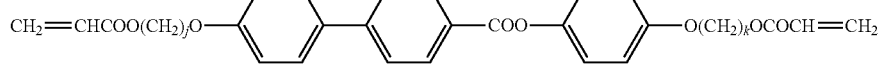
(VI-22)
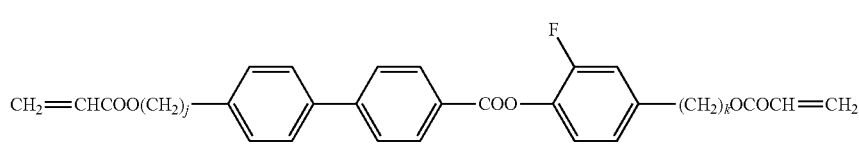
(VI-23)
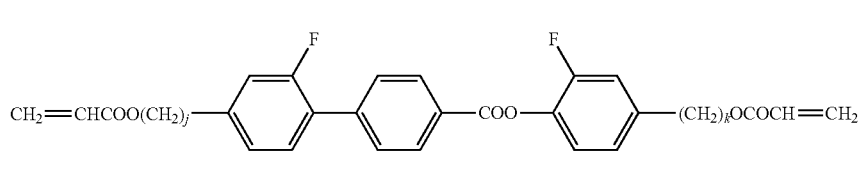
(VI-24)
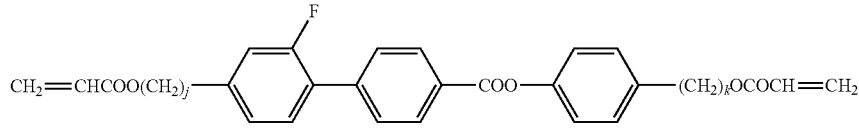
(VI-25)
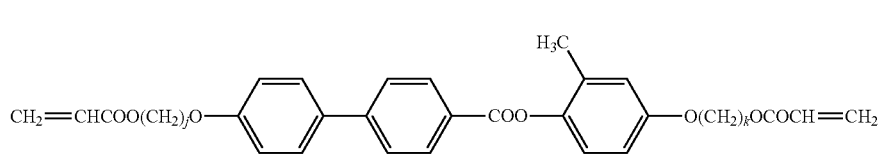

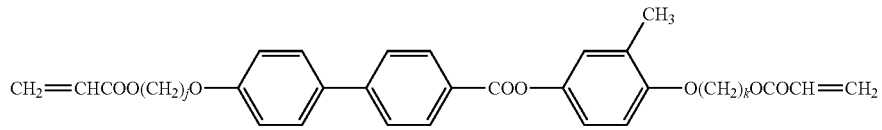
(VI-26)
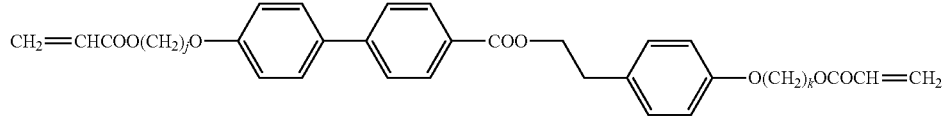
(VI-27)
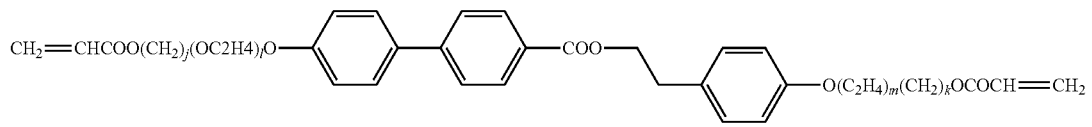
(VI-28)
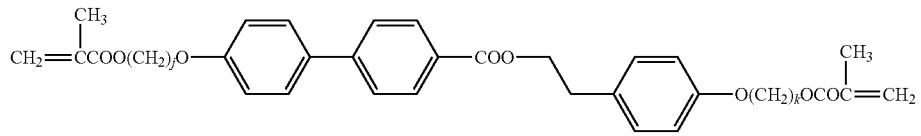
(VI-29)
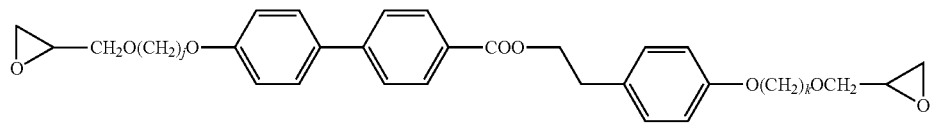
(VI-30)
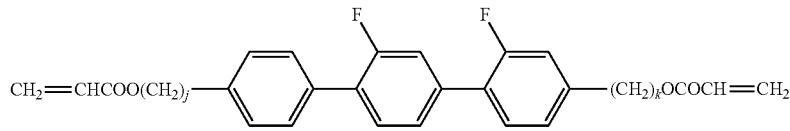
(VI-31)
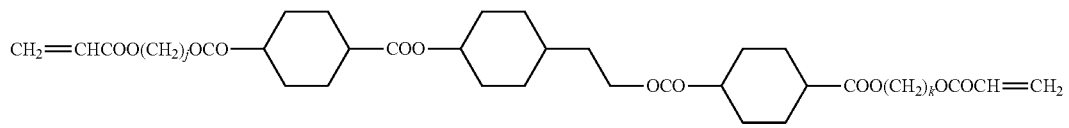
(VI-32)
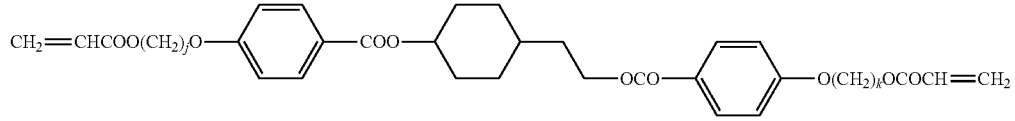
(VI-33)
[Chem. 31]
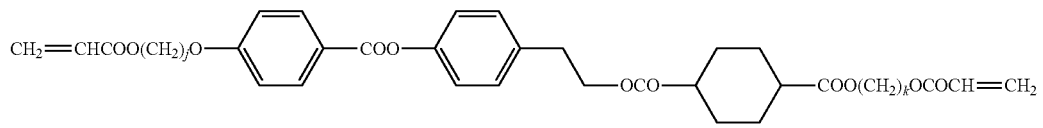
(VI-34)
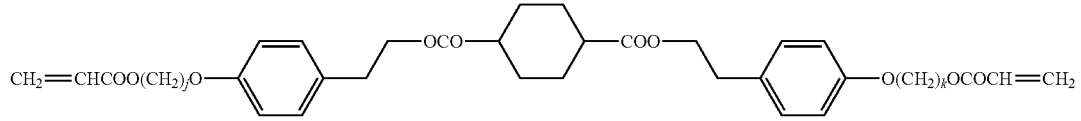
(VI-35)
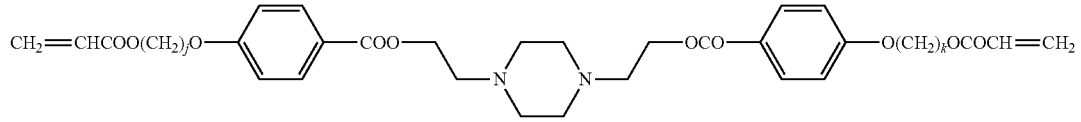
(VI-36)

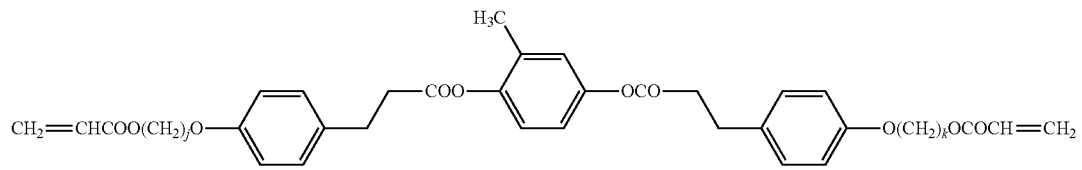
(VI-37)
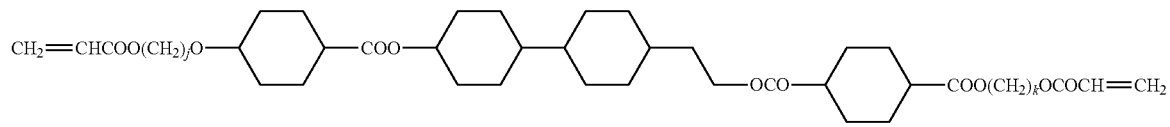
(VI-38)
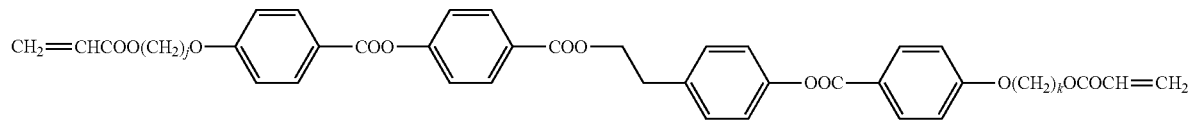
(VI-38)
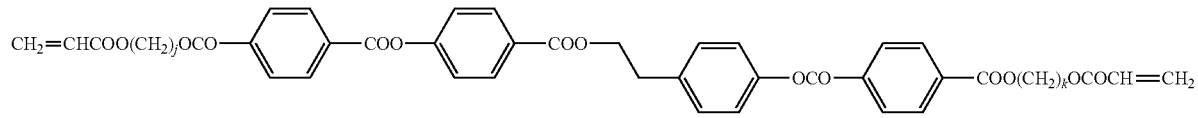
(VI-40)
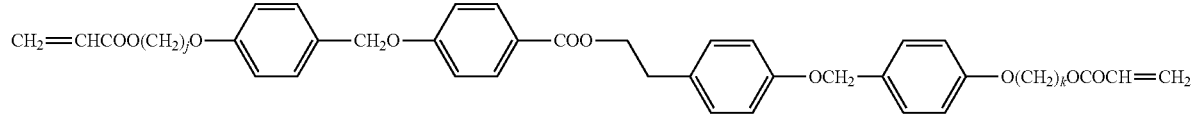
(VI-41)
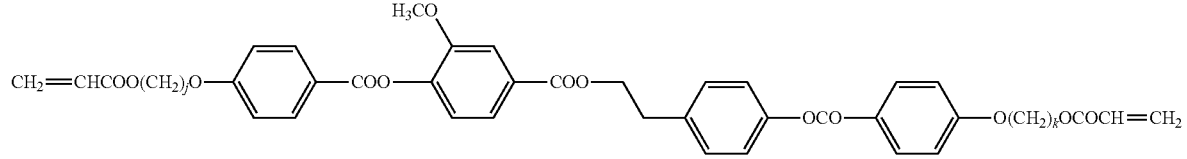
(VI-42)
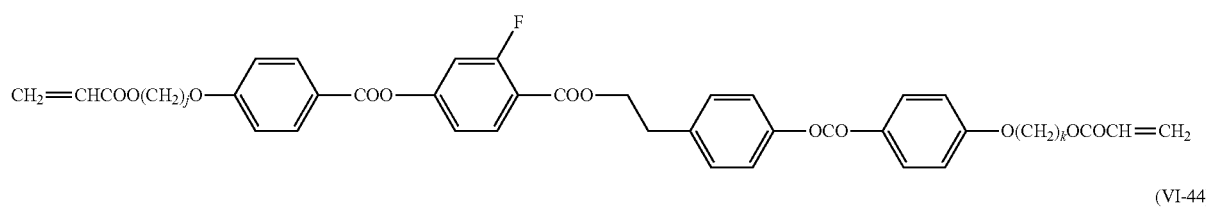
(VI-43)
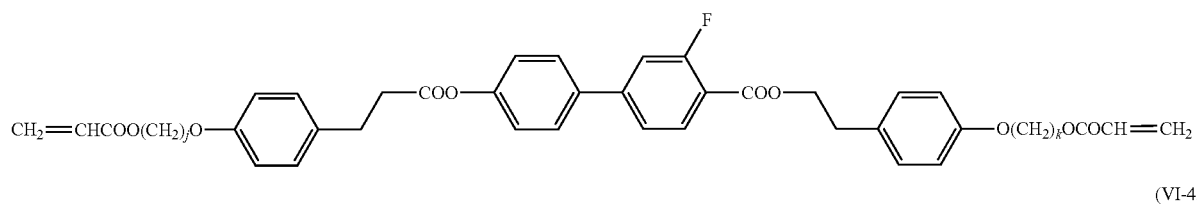
(VI-44)
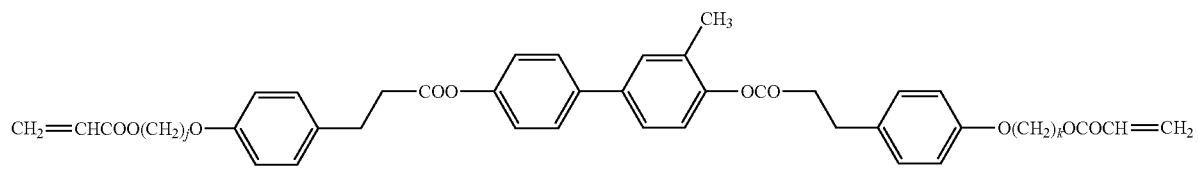
(VI-45)

-continued

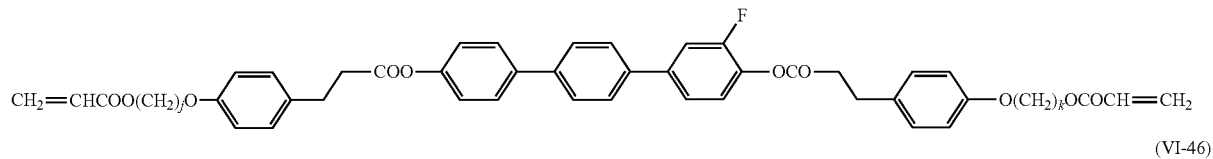
(VI-46)

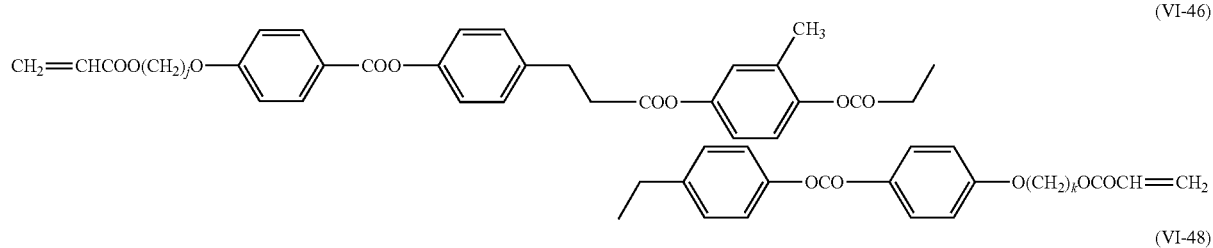
(VI-46)

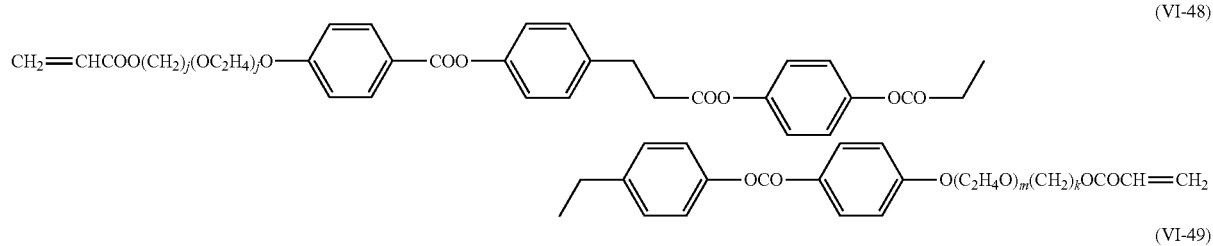
(VI-48)

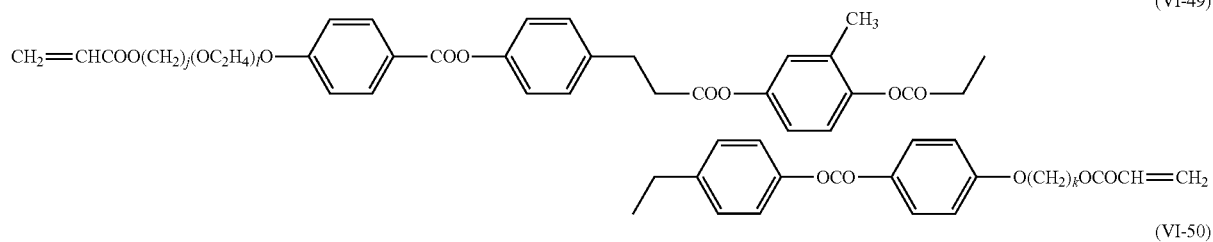
(VI-49)

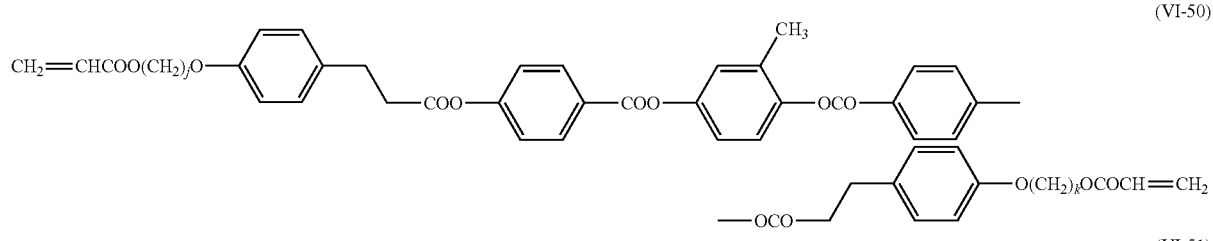
(VI-50)

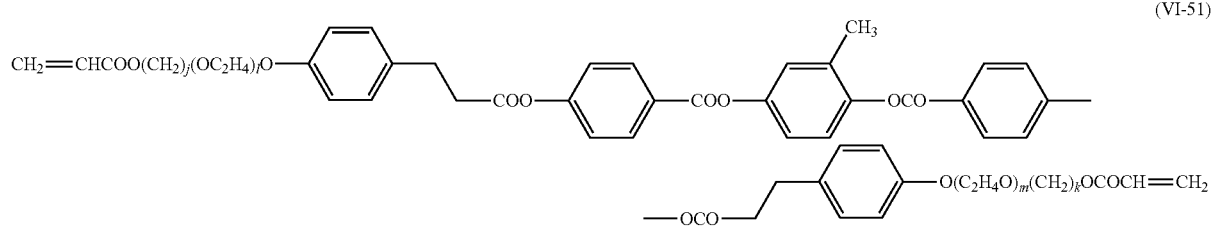
(VI-51)

(In the formulae, j, k, l, and m each independently represent an integer of 2 to 18.)

Among the compounds described above, the compounds represented by the formulae (VI-8) and (VI-9) are preferred. The content of such a compound is preferably 50% or more, more preferably 55% or more, and particularly preferably 60% or more. Compounds whose j and k are 3, 4, or 6 are preferably used to reduce the compound production cost and properly set the mesomorphic temperature range. The polymerizable liquid crystal composition preferably exhibits a chiral nematic phase. The lower limit temperature of the chiral nematic phase is preferably lower than 40° C., more preferably lower than 30° C., and particularly preferably lower than 20° C. The upper limit temperature of the chiral nematic phase is preferably higher than 60° C., more preferably higher than 80° C., and particularly preferably higher than 100° C.

The helical pitch of the chiral nematic phase is preferably designed so that the selective reflection of the chiral nematic phase does not occur in the visible region. In other words, the selective reflection is preferably caused to occur in the infrared or ultraviolet region and particularly preferably in the ultraviolet region.

The polymerizable liquid crystal composition of the present invention preferably contains a polymerization inhibitor in a concentration of 1000 to 15000 ppm. Examples of the polymerization inhibitor include hydroquinone, hydroquinone monoalkyl ethers, tert-butylcatechols, pyrogallols, thiophenols, nitro compounds, β-naphthylamines, β-naphthols, and nitroso compounds. More specifically, methoxyphenol and 2,6-di-tert-butylphenol are exemplified.

The polymerizable liquid crystal composition of the present invention may contain a disc-shaped compound. Such a disc-shaped compound preferably has a structure in which a benzene derivative, a triphenylene derivative, a truxene derivative, a phthalocyanine derivative, or a cyclohexane derivative serves as a mother nucleus, which is the center of a molecule, and the mother nucleus radially has a linear alkyl group, a linear alkoxy group, or a substituted benzoyloxy group as its side chain. The disc-shaped compound more preferably has a structure represented by general formula (VII)

[Chem. 32]

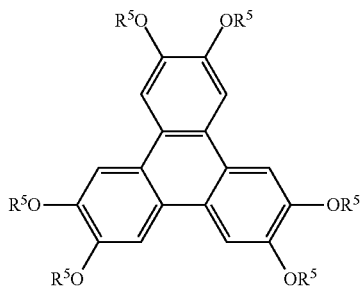
(VII)

(in the formula, $R^5$ each independently represent a substituent represented by general formula (VII-a))

[Chem. 33]

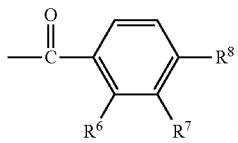
(VII-a)

(in the formula, $R^6$ and $R^7$ each independently represent a hydrogen atom, a halogen atom, or a methyl group; $R^8$ represents an alkoxy group having 1 to 20 carbon atoms; and a hydrogen atom in the alkoxy group may be substituted with a substituent represented by general formula (VII-b) or general formula (VII-c))

[Chem. 34]

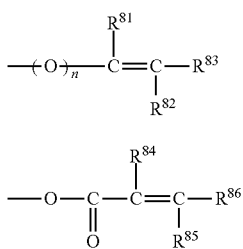
(VII-b)

(VII-c)

(in the formula, $R^{81}$, $R^{82}$, $R^{83}$, $R^{85}$, and $R^{86}$ each independently represent a hydrogen atom, a halogen atom, or an alkyl group having 1 to 5 carbon atoms, and n represents 0 or 1). In the general formula (VII), at least one of $R^8$ preferably represents an alkoxy group substituted with a substituent represented by the general formula (VII-b) or the general formula (VII-c), and all of $R^8$ particularly preferably represent an alkoxy group substituted with a substituent represented by the general formula (VII-b) or the general formula (VII-c).

More specifically, the substituent represented by the general formula (VII-a) particularly preferably has a structure represented by general formula (VII-e)

[Chem. 35]

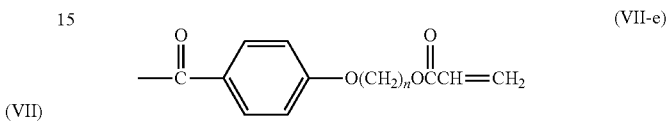
(VII-e)

(in the formula, n represents an integer of 2 to 9).

In order to quickly achieve good planar orientation after application, the polymerizable liquid crystal composition of the present invention preferably contains a compound whose weight-average molecular weight is 100 or more and that has a repeating unit represented by general formula (VIII)

[Chem. 36]

(VIII)

(in the formula, $R^1$, $R^2$, $R^3$, and $R^4$ each independently represent a hydrogen atom, a halogen atom, or a hydrocarbon group having 1 to 20 carbon atoms, and a hydrogen atom in the hydrocarbon group may be substituted with at least one halogen atom).

Examples of the compound represented by the general formula (VIII) include polyethylene, polypropylene, polyisobutylene, paraffin, liquid paraffin, chlorinated polypropylene, chlorinated paraffin, and chlorinated liquid paraffin. In addition, compounds containing a fluorine atom are also effective to suppress unevenness. Among the compounds having the repeating unit represented by the general formula (VIII), compounds having repeating units represented by formulae (VIII-a) to (VIII-f) as preferred structures are exemplified.

[Chem. 37]

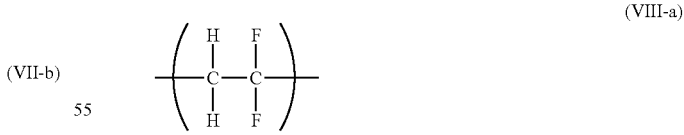
(VIII-a)

(VIII-b)

(VIII-c)

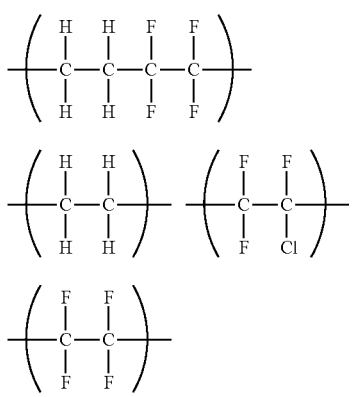

(VIII-d)

(VIII-e)

(VIII-f)

Among them, the structures represented by the general formulae (VIII-a) to (VIII-e) are more preferably used, and the structures represented by the general formulae (VIII-a) and (VIII-c) are particularly preferred. A copolymer obtained by copolymerizing two or more compounds having the repeating units represented by the formulae (VIII-a) to (VIII-f) is also preferred. In this case, a copolymer having the structures represented by the formulae (VIII-a) and (VIII-b), a copolymer having the structures represented by the formulae (VIII-a) and (VIII-C), a copolymer having the structures represented by the formulae (VIII-a) and (VIII-f), and a copolymer having the structures represented by the formulae (VIII-a), (VIII-b), and (VIII-f) are more preferred; and a copolymer having the structures represented by the formulae (VIII-a) and (VIII-b) and a copolymer having the structures represented by the formulae (VIII-a), (VIII-b), and (VIII-f) are particularly preferred.

If the weight-average molecular weight of the compound is excessively low, the effect of reducing a tilt angle becomes poor. If the weight-average molecular weight is excessively large, the orientation is not stabilized for a long time. Therefore, there is an optimum range for the weight-average molecular weight. Specifically, the weight-average molecular weight is preferably 200 to 1000000, more preferably 300 to 100000, and particularly preferably 400 to 80000. In particular, in the case of polyethylene or polypropylene, the weight-average molecular weight is preferably 500 to 3000, more preferably 1000 to 2500, and particularly preferably 1800 to 2300.

The content of the compound in the polymerizable liquid crystal composition is preferably 0.01 to 5 mass %, more preferably 0.05 to 2 mass %, and particularly preferably 0.1 to 1 mass %.

The polymerizable liquid crystal composition of the present invention preferably contains a chiral compound to obtain a chiral nematic phase. Among chiral compounds, a compound having a polymerizable functional group in its molecule is particularly preferred. An acryloyloxy group is particularly preferred as the polymerizable functional group. The amount of the chiral compound added needs to be suitably adjusted in accordance with the helical twisting power of the compound, but is preferably 12% or less.

A preferred example of the chiral compound is a compound represented by the general formula (IV) in which any one of A4, A5, and A6 is represented by formula (I-b-1), (I-b-2), or (I-b-3).

[Chem. 38]

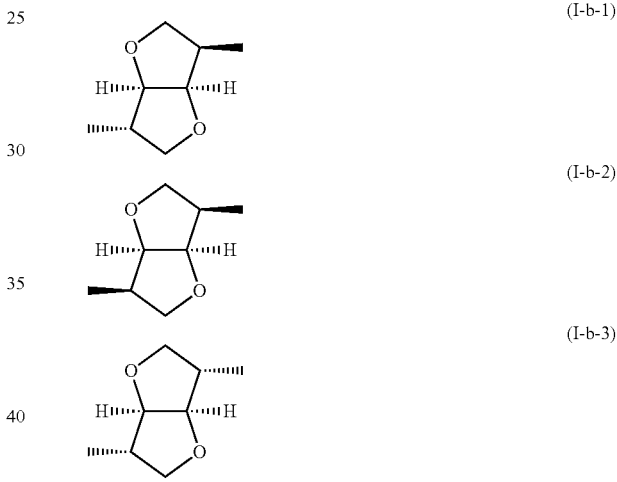

Compounds represented by formulae (c) to (g) can be exemplified as the chiral compound

[Chem. 39]

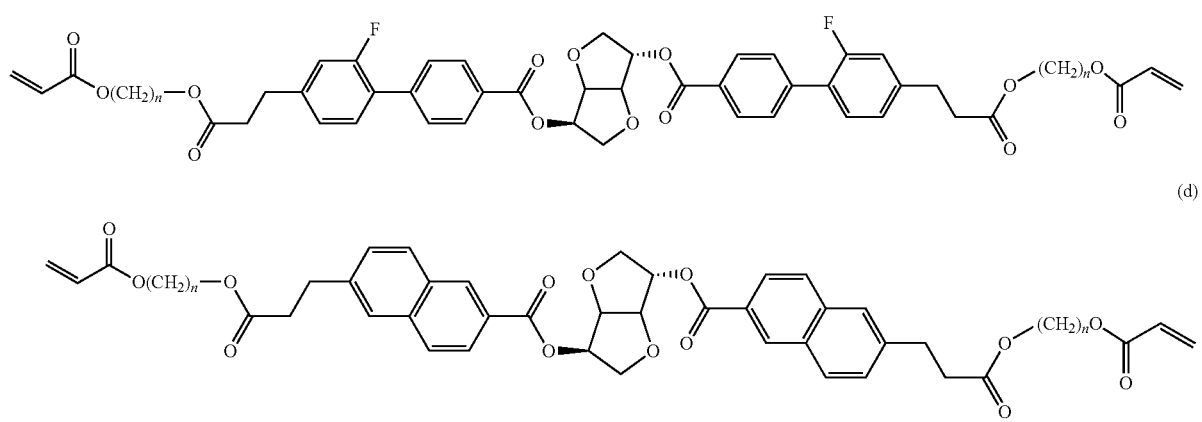

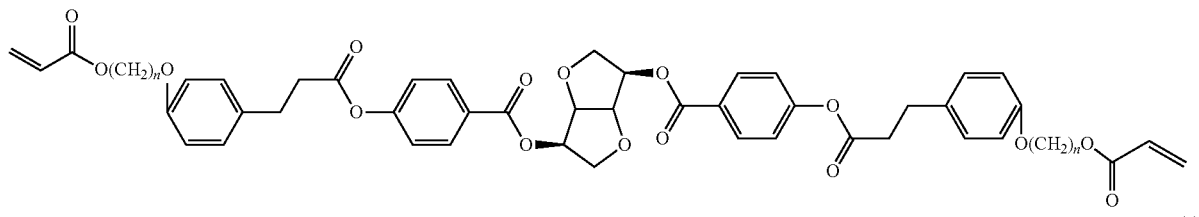

(e)

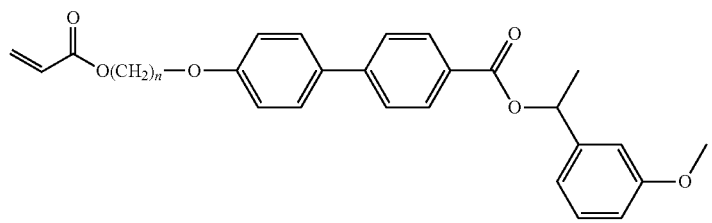

(f)

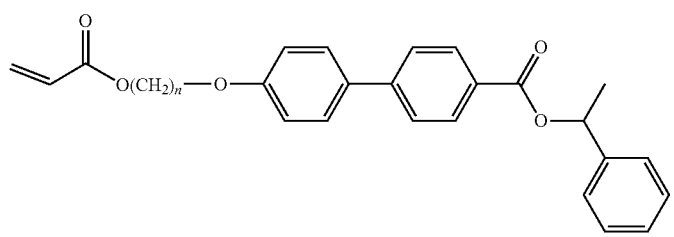

(g)

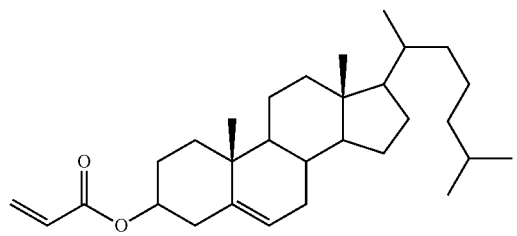

(in the formulae, n represents an integer of 2 to 12). In this case, n is preferably 2 or 4 in terms of synthesis cost.

The polymerizable liquid crystal composition of the present invention preferably contains a surfactant in order to ensure the surface smoothness after the application. Any of ionic surfactants and nonionic surfactants may be used as the surfactant. Examples of the surfactant that can be added include alkyl carboxylates, alkyl phosphates, alkyl sulfonates, fluoroalkyl carboxylates, fluoroalkyl phosphates, fluoroalkyl sulfonates, polyoxyethylene derivatives, fluoroalkyl ethylene oxide derivatives, polyethylene glycol derivatives, alkylammonium salts, fluoroalkylammonium salts, and silicone derivatives. In particular, fluorine-containing surfactants and silicone derivatives are preferred.

Specific examples of the surfactant include "MEGAFAC F-110", "MEGAFAC F-113", "MEGAFAC F-120", "MEGAFAC F-812", "MEGAFAC F-142D", "MEGAFAC F-144D", "MEGAFAC F-150", "MEGAFAC F-171", "MEGAFAC F-173", "MEGAFAC F-177", "MEGAFAC F-183", "MEGAFAC F-195", "MEGAFAC F-824", "MEGAFAC F-833", "MEGAFAC F-114", "MEGAFAC F-410", "MEGAFAC F-493", "MEGAFAC F-494", "MEGAFAC F-443", "MEGAFAC F-444", "MEGAFAC F-445", "MEGAFAC F-446", "MEGAFAC F-470", "MEGAFAC F-471", "MEGAFAC F-474", "MEGAFAC F-475", "MEGAFAC F-477", "MEGAFAC F-478", "MEGAFAC F-479", "MEGAFAC F-480SF", "MEGAFAC F-482", "MEGAFAC F-483", "MEGAFAC F-484", "MEGAFAC F-486", "MEGAFAC F-487", "MEGAFAC F-489", "MEGAFAC F-172D", "MEGAFAC F-178K", "MEGAFAC F-178RM", "MEGAFAC R-08", "MEGAFAC R-30", "MEGAFAC F-472SF", "MEGAFAC BL-20", "MEGAFAC R-61", "MEGAFAC R-90", "MEGAFAC ESM-1", and "MEGAFAC MCF-350SF" (manufactured by DIC Corporation);

"Ftergent 100", "Ftergent 100C", "Ftergent 110", "Ftergent 150", "Ftergent 150CH", "Ftergent A", "Ftergent 100A-K", "Ftergent 501", "Ftergent 300", "Ftergent 310", "Ftergent 320", "Ftergent 400SW", "FTX-400P", "Ftergent 251", "Ftergent 215M", "Ftergent 212 MH", "Ftergent 250", "Ftergent 222F", "Ftergent 212D", "FTX-218", "FTX-209F", "FTX-213F", "FTX-233F", "Ftergent 245F", "FTX-208G", "FTX-240G", "FTX-206D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730LS", "FTX-730LM", "FTX-730LL", and "FTX-710LL" (manufactured by NEOS Company Limited);

"BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-

337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-Silclean 3700" (manufactured by BYK Japan KK); and
"TEGO Rad 2100", "TEGO Rad 2200N", "TEGO Rad 2250", "TEGO Rad 2300", "TEGO Rad 2500", "TEGO Rad 2600", and "TEGO Rad 2700" (manufactured by Tego). The preferred content of the surfactant depends on the service temperature and the components other than the surfactant contained in the polymerizable liquid crystal composition. The content of the surfactant in the polymerizable liquid crystal composition is preferably 0.01 to 1 mass %, more preferably 0.02 to 0.5 mass %, and particularly preferably 0.03 to 0.1 mass %. If the content is less than 0.01 mass %, the effect of suppressing thickness unevenness is not easily achieved. The sum of the content of the surfactant and the content of the compound whose weight-average molecular weight is 100 or more and that has the repeating unit represented by the general formula (VIII) is preferably 0.02 to 0.5 mass %, more preferably 0.05 to 0.4 mass %, and particularly preferably 0.1 to 0.2 mass %.

The polymerizable liquid crystal composition of the present invention may contain a non-liquid crystalline polymerizable compound. Any non-liquid crystalline polymerizable compound can be used as long as, in the technical field of monomers, the compound does not exhibit liquid crystallinity and is recognized as a photopolymerizable monomer. Among them, a photoradically polymerizable monomer is preferred. Specifically, an acrylate compound or a methacrylate compound is preferred. Preferably, the non-liquid crystalline polymerizable compound is not in the form of a crystal, but is in the form of a solution at 25° C. The viscosity is preferably 100 mPa·s or less, more preferably 50 mPa·s or less, particularly preferably 20 mPa·s or less, and most preferably 15 mPa·s or less. At a lower viscosity, the time until orientation is stabilized after the application tends to be shortened. A monofunctional acrylate compound having a single benzene ring as a skeleton is preferably used. Specifically, such a compound is preferably represented by general formula (AA)

[Chem. 40]

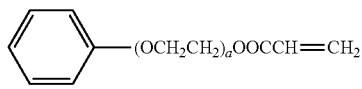

(AA)

(in the formula, a represents an integer of 0 to 4). In the formula (AA), a is preferably 1 or 2.

When the non-liquid crystalline polymerizable compound contained in a certain concentration is applied to a substrate, the orientation uniformly occurs so that the helical axis extends in a vertical direction. As a result the haze can be reduced.

The concentration of the non-liquid crystalline polymerizable compound in the polymerizable liquid crystal composition is preferably 0.5 to 4%, more preferably 1 to 3%, and particularly preferably 1.5 to 2%. If the concentration is 0.5% or less, the effect of uniformly causing orientation, when the compound is applied to a substrate, so that the helical axis of cholesteric liquid crystal extends in a vertical direction is decreased. If the concentration is 4% or more, the cholesteric liquid crystallinity is impaired and thus the haze tends to be increased.

The optically anisotropic body of the present invention can be obtained by causing the polymerizable liquid crystal composition of the present invention to be supported on a substrate to orient the composition and then by curing the composition through irradiation with ultraviolet rays or electron beams. When a biaxial optically anisotropic body (film) is produced, the irradiation is preferably performed with polarized ultraviolet rays. The intensity of the polarized ultraviolet rays is preferably 20 mJ/cm$^2$ or less, more preferably 15 mJ/cm$^2$ or less, and particularly preferably 10 mJ/cm$^2$. The intensity is preferably more than 5 mJ/cm$^2$. The polarized ultraviolet rays preferably have a wavelength of 280 to 400 nm and more preferably a wavelength of 280 to 380 nm. Alternatively, the polarized ultraviolet rays may be mainly composed of polarized light having a wavelength of 280 to 320 nm or a wavelength of 320 to 380 nm. In any case, conditions need to be set so that an optically anisotropic body having both sufficiently large front phase difference and high heat resistance and reliability is obtained. The temperature during the irradiation with ultraviolet rays needs to be kept at a temperature at which the polymerizable liquid crystal composition exhibits a liquid crystalline phase and a chiral nematic phase. The exposure is preferably performed in the air without replacing the atmosphere with an inert gas such as nitrogen or argon. The replacement with an inert gas increases the takt time, which is disadvantageous to production cost.

After the irradiation with the polarized ultraviolet rays (first exposure step), irradiation with unpolarized ultraviolet rays (second exposure step) may be performed. In this case, sufficiently large front phase difference and high degree of curing, that is, high heat resistance and reliability can be provided without increasing the takt time of an expensive polarized ultraviolet ray irradiation apparatus.

The first exposure step includes a step of performing irradiation with polarized ultraviolet rays having a wavelength that is the same as the light absorption wavelength of the photoinitiator. Various compounds having light absorption wavelengths are known as the photoinitiator. Specifically, polarized ultraviolet rays mainly composed of polarized light having a wavelength of 280 to 320 nm or a wavelength of 320 to 380 nm are preferably used, and polarized ultraviolet rays mainly composed of polarized light having a wavelength of 320 to 380 nm are more preferably used.

In this case, when multiple photoinitiators are contained, a light absorption wavelength of the irradiated polarized ultraviolet rays is a light absorption wavelength of one of the photoinitiators.

The main component preferably has an accumulated intensity of 80% or more and more preferably 90% or more at least in the selected wavelength range.

Since an excessively high intensity of the polarized ultraviolet rays decreases the front phase difference, the exposure intensity in the first exposure step is preferably 20 mJ/cm$^2$ or less, more preferably 15 mJ/cm$^2$ or less, and particularly preferably 10 mJ/cm$^2$ or less. The intensity is preferably more than 5 mJ/cm$^2$.

To shorten the takt time and improve the productivity, the irradiation time with the polarized ultraviolet rays in the first exposure step is preferably 60 seconds or less, more preferably 30 seconds or less, and particularly preferably 15 seconds or less. The irradiation time is preferably more than 1 second.

The temperature during the irradiation is not particularly limited, but needs to be kept at a temperature at which the polymerizable liquid crystal composition exhibits a liquid crystalline phase and a chiral nematic phase.

In the second exposure step, irradiation with unpolarized ultraviolet rays having a wavelength of 200 to 400 nm is performed. Irradiation with unpolarized ultraviolet rays having a wavelength other than the wavelength selected in the first exposure step is preferably performed. Herein, the unpolarized ultraviolet rays preferably have an intensity of 20% or more at the wavelength other than the wavelength selected in the first exposure step, more preferably 40% or more, and particularly preferably 60% or more.

The exposure in the first exposure step is preferably 50 mJ/cm$^2$ or more, more preferably 100 mJ/cm$^2$ or more, and particularly preferably 400 mJ/cm$^2$ or more. The exposure is preferably less than 2000 mJ/cm$^2$. If the exposure is more than 2000 mJ/cm$^2$, the film obtained tends to turn yellow.

The exposure in the second exposure step is preferably 200 mJ/cm$^2$ or more, more preferably 400 mJ/cm$^2$ or more, and particularly preferably 600 mJ/cm$^2$ or more. The exposure is preferably less than 2000 mJ/cm$^2$. If the exposure is more than 2000 mJ/cm$^2$, the film obtained tends to turn yellow. The polymerizable liquid crystal composition can be supported by dissolving the polymerizable liquid crystal composition in a solvent, applying the solution on a substrate, and then volatilizing the solvent. The polymerizable liquid crystal composition may be directly applied onto a substrate without dissolving the polymerizable liquid crystal composition in a solvent. Preferred examples of an organic solvent include alkyl-substituted benzenes such as toluene, xylene, and cumene, propylene glycol monomethyl ether acetate, butyl acetate, cyclohexanone, and cyclopentanone. Furthermore, dimethylformamide, γ-butyrolactone, N-methylpyrrolidinone, methyl ethyl ketone, ethyl acetate, or the like may be added to the above-described solvents. The solvent can be volatilized by performing heat treatment at 60 to 150° C., more preferably 80 to 120° C., for 15 to 120 seconds, more preferably 30 to 90 seconds. Vacuum drying can be combined with the heat treatment. Examples of the application method include spin coating, die coating, extrusion coating, roll coating, wire-bar coating, gravure coating, spray coating, dipping, and printing. The substrate may be composed of an inorganic material such as glass or an organic material such as a plastic film. Such a substrate may be used without a treatment, or an orientation treatment may be performed on such a substrate. Examples of the orientation treatment include a rubbing treatment in which a substrate is rubbed with cloth or the like, a treatment in which an organic thin film composed of polyimide or the like is formed on a substrate and then the rubbing treatment is performed thereon, and a photo-orientation treatment in which a photo-orientation film is formed on a substrate and then irradiation with polarized ultraviolet rays is performed.

EXAMPLES

The present invention will now be further described in detail based on Examples, but is not limited to these Examples. Note that % indicates mass %. A front phase difference Re was measured with RETS-100 manufactured by Otsuka Electronics Co., Ltd. (wavelength: 589 nm). A phase difference in the thickness direction was obtained by measuring the angle dependence of a phase difference with RETS-100 manufactured by Otsuka Electronics Co., Ltd. and then performing fitting with computer simulation software LCD-Master (manufactured by SHINTECH, Inc).

Reference Example 1

Preparation of Polymerizable Liquid Crystal Composition

A polymerizable liquid crystal composition (A) was prepared that contains 35.18% of a liquid crystal acrylate compound represented by the formula (VI-9-a),

[Chem. 41]

(VI-9-a)

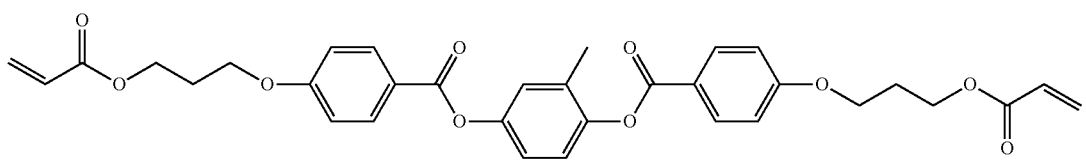

15.08% of a liquid crystal acrylate compound represented by the formula (VI-9-b),

[Chem. 42]

(VI-9-b)

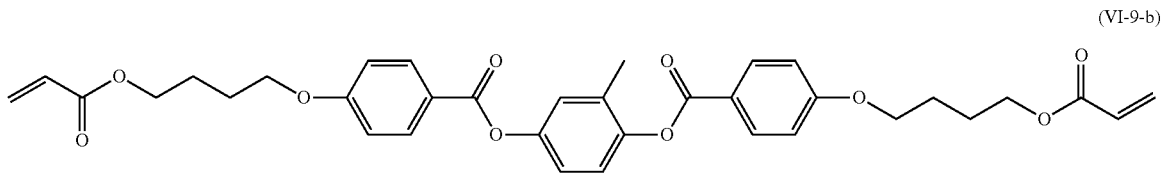

12.56% of a liquid crystal acrylate compound represented by the formula (VI-8-a),

[Chem. 43]

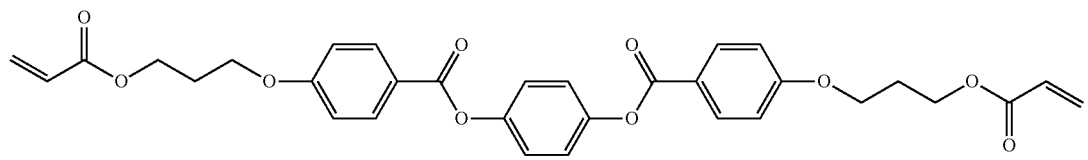

(VI-8-a)

20.94% of a liquid crystal acrylate compound represented by the formula (V-5-a),

[Chem. 44]

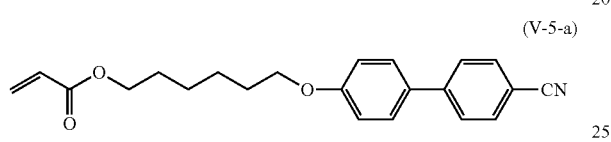

(V-5-a)

8.79% of a chiral acrylate compound represented by the formula (a-1) (FIG. 3 shows a spectrum obtained when this compound is dissolved in acetonitrile in a concentration of 20 ppm and measurement is performed at an optical path length of 1 cm. It is understood that the compound represented by the formula (a-1) has a peak wavelength of 285 nm and an absorbance of 1.77.),

[Chem. 45]

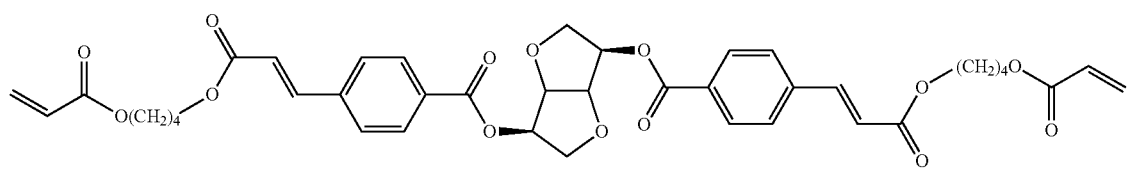

(a-1)

2.93% of a chiral acrylate compound represented by the formula (e-1),

[Chem. 46]

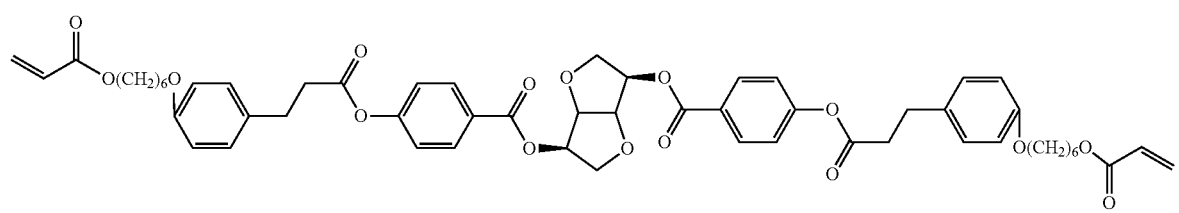

(e-1)

0.25% of liquid paraffin, 0.08% of p-methoxyphenol, and 4.19% of a photoinitiator Irgacure OXE-01 (manufactured by Ciba Specialty Chemicals). The photoinitiator Irgacure OXE-01 has the following structure.

[Chem. 47]

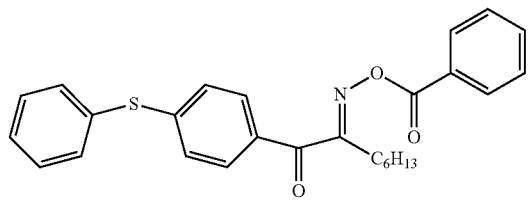

(IRGACURE OXE 01)

FIG. 4 shows a spectrum obtained when Irgacure OXE-01 is dissolved in acetonitrile in a concentration of 20 ppm and measurement is performed at an optical path length of 1 cm.

It is understood that Irgacure OXE-01 has a peak wavelength of 327 nm and an absorbance of 0.53.

Example 1

A polymerizable liquid crystal composition (B) of the present invention containing 99.26% of the polymerizable liquid crystal composition (A) prepared in Reference Example 1 and 0.74% of a light-absorbing agent represented by formula (X-1) was prepared.

[Chem. 48]

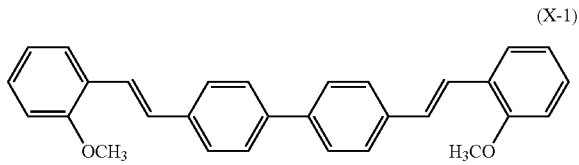

(X-1)

The light-absorbing agent represented by the formula (X-1) had an absorption band near 360 nm.

A polymerizable liquid crystal solution (B) was prepared so as to contain 40% of the polymerizable liquid crystal composition (B) and 60% of cyclohexanone. The polymerizable liquid crystal solution (B) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm in the air for 300 seconds to cure the polymerizable liquid crystal composition. The resultant film had a thickness of 3 μm and was an optically biaxial film. The front phase difference Re was 46 nm and the phase difference Rth in the thickness direction was 206 nm. FIG. 5 is a measurement graph showing the incident angle dependence of a phase difference of the resultant biaxial film.

Example 2

A biaxial film was produced in the same manner as in Example 1, except that the concentration of the polymerizable liquid crystal composition (A) was changed to 99.26% and the concentration of the light-absorbing agent (X-1) was changed to 0.74%. The front phase difference Re was 45 nm and the phase difference Rth in the thickness direction was 207 nm.

Example 3

A biaxial film was produced in the same manner as in Example 1, except that the concentration of the polymerizable liquid crystal composition (A) was changed to 99.01% and the concentration of the light-absorbing agent (X-1) was changed to 0.99%. The front phase difference Re was 45 nm and the phase difference Rth in the thickness direction was 201 nm.

Example 4

A biaxial film was produced in the same manner as in Example 1, except that the concentration of the polymerizable liquid crystal composition (A) was changed to 98.52% and the concentration of the light-absorbing agent (X-1) was changed to 1.48%. The front phase difference Re was 42 nm and the phase difference Rth in the thickness direction was 188 nm.

Comparative Example 1

A biaxial film was produced in the same manner as in Example 1, except that the light-absorbing agent was not added to the polymerizable liquid crystal composition (A). The front phase difference Re was 35 nm and the phase difference Rth in the thickness direction was 181 nm. FIG. 6 is a measurement graph showing the incident angle dependence of a phase difference of the resultant biaxial film. As is clear from the drawing, in the case where a publicly known oxime ester-based photoinitiator Irgacure OXE-01 is used alone, a polymerizable liquid crystal composition can be cured in the air, but there is a problem in that the front phase difference is small.

Comparative Example 2

A polymerizable liquid crystal composition (C) was prepared in the same manner, except that a dichromatic initiator represented by formula (PI-1) was used instead of the photoinitiator Irgacure OXE-01 in Reference Example 1.

[Chem. 49]

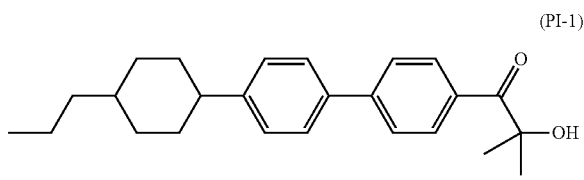

(PI-1)

A polymerizable liquid crystal solution (C) was prepared so as to contain 60% of the polymerizable liquid crystal composition (C) and 40% of cyclohexanone. The polymerizable liquid crystal solution (C) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm in the air for 300 seconds, but was not cured. As is clear from the description above, in the case where a dichromatic initiator is used, a polymerizable liquid crystal composition cannot be cured in the air.

Example 5

A polymerizable liquid crystal composition (D) of the present invention containing 99.50% of the polymerizable liquid crystal composition (A) prepared in Reference Example 1 and 0.50% of a compound represented by formula (III-2a) was prepared.

[Chem. 50]

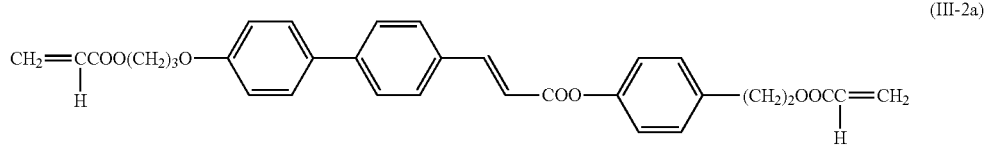

(III-2a)

FIG. 2 shows a spectrum obtained when the compound represented by the formula (III-2a) is dissolved in acetonitrile in a concentration of 20 ppm and measurement is performed with an optical path length of 1 cm. It is clear from FIG. 2 that the absorption peak of the compound is present at 327 nm and the absorbance Ac is 1.47. Thus, the absorbance A of the polymerizable liquid crystal composition (D) is calculated to be 368 from the calculation formulae 1 and 2.

A polymerizable liquid crystal solution (D) was prepared so as to contain 40% of the polymerizable liquid crystal composition (D) and 60% of cyclohexanone. The polymerizable liquid crystal solution (D) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm in the air for 300 seconds to cure the polymerizable liquid crystal composition. The resultant film had a thickness of 3 μm and was an optically biaxial film. The front phase difference Re was 38 nm and the phase difference Rth in the thickness direction was 185 nm.

Example 6

A polymerizable liquid crystal composition (E) of the present invention containing 99.26% of the polymerizable liquid crystal composition (A) and 0.74% of the compound represented by the formula (III-2a) was prepared. The absorbance of this composition is calculated to be 544. A polymerizable liquid crystal solution (E) was prepared so as to contain 40% of the polymerizable liquid crystal composition (E) and 60% of cyclohexanone. A biaxial film was produced in the same manner as in Example 5 using the solution (E). The front phase difference Re of the resultant film was 39 nm and the phase difference Rth in the thickness direction was 186 nm.

Example 7

A polymerizable liquid crystal composition (F) of the present invention containing 99.01% of the polymerizable liquid crystal composition (A) and 0.99% of the compound represented by the formula (III-2a) was prepared. The absorbance of this composition is calculated to be 735. A polymerizable liquid crystal solution (F) was prepared so as to contain 40% of the polymerizable liquid crystal composition (F) and 60% of cyclohexanone. A biaxial film was produced in the same manner as in Example 5 using the solution (F). The front phase difference Re of the resultant film was 42 nm and the phase difference Rth in the thickness direction was 187 nm.

Example 8

A polymerizable liquid crystal composition (G) of the present invention containing 98.52% of the polymerizable liquid crystal composition (A) and 1.480 of the compound represented by the formula (III-2a) was prepared. The absorbance of this composition is calculated to be 1088. A polymerizable liquid crystal solution (G) was prepared so as to contain 40% of the polymerizable liquid crystal composition (G) and 60% of cyclohexanone. A biaxial film was produced in the same manner as in Example 5 using the solution (G). The front phase difference Re of the resultant film was 43 nm and the phase difference Rth in the thickness direction was 183 nm. FIG. 7 shows a measurement result of the incident angle dependence of a phase difference.

Comparative Example 3

A biaxial film was produced in the same manner as in Example 5, except that the compound represented by the formula (III-2a) was not added to the polymerizable liquid crystal composition (A). The front phase difference Re was 35 nm and the phase difference Rth in the thickness direction was 181 nm. FIG. 8 is a measurement graph showing the incident angle dependence of a phase difference of the resultant biaxial film. As is clear from the drawing, in the case where a polymerizable liquid crystal compound having the predetermined light absorption band of the present invention is not contained and a publicly known oxime ester-based photoinitiator Irgacure OXE-01 is used alone, a polymerizable liquid crystal composition can be cured in the air, but there is a problem in that the front phase difference is small.

Reference Example 2

Preparation of Polymerizable Liquid Crystal Composition

A polymerizable liquid crystal composition (1A) was prepared that contains 36.47% of a liquid crystal acrylate compound represented by the formula (IV-9-a),

[Chem. 51]

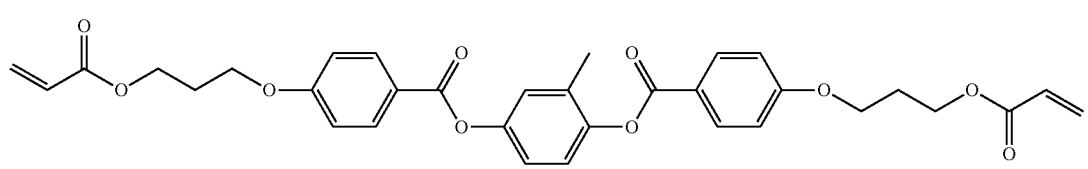

(IV-9-a)

15.63% of a liquid crystal acrylate compound represented by the formula (IV-9-b),
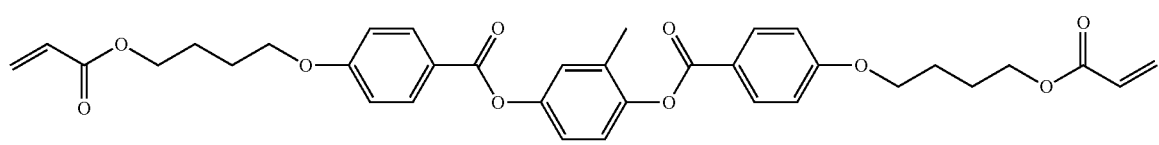
(IV-9-b)
13.03% of a liquid crystal acrylate compound represented by the formula (IV-8-a),
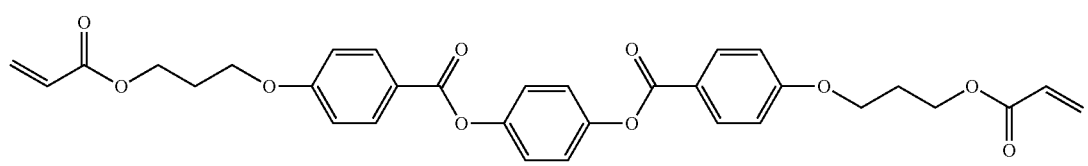
(IV-8-a)
21.71% of a liquid crystal acrylate compound represented by the formula (I-5-a),
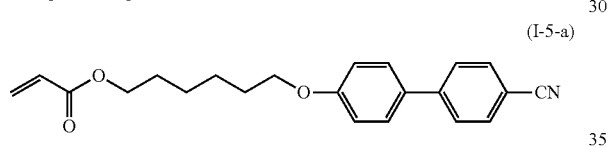
(I-5-a)
9.12% of a chiral acrylate compound represented by the formula (a-1),
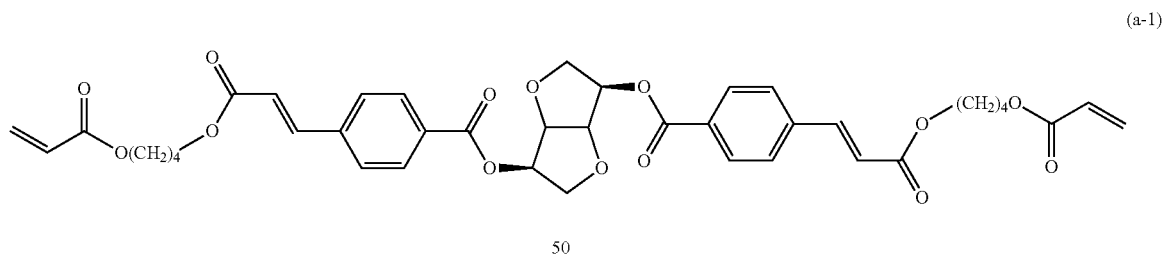
(a-1)
3.04% of a chiral acrylate compound represented by the formula (e-1),
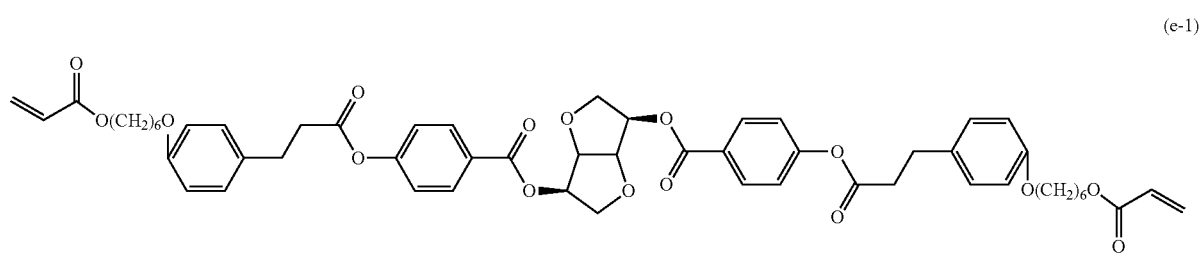
(e-1)

0.65% of a light-absorbing agent represented by formula (X-1),

[Chem. 57]

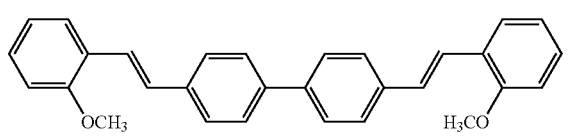

(X-1)

0.26% of liquid paraffin, and 0.09% of p-methoxyphenol. The light-absorbing agent (PA-1) had an absorption band near 360 nm.

Example 9

A polymerizable liquid crystal composition (1B) containing 95.84% of the polymerizable liquid crystal composition (1A) prepared in Reference Example 2 and 4.16% of a photoinitiator 2,4,6-trimethylbenzoyl-diphenyl phosphine oxide (Darocur TPO manufactured by Ciba Specialty Chemicals) having an absorption band near 360 nm was prepared.

[Chem. 58]

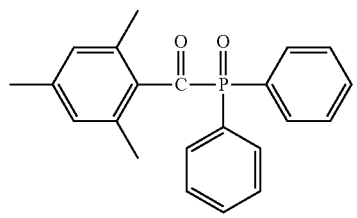

FIG. 9 shows an absorption spectrum of Darocur TPO.

A polymerizable liquid crystal solution (1B) was prepared so as to contain 40% of the polymerizable liquid crystal composition (1B) and 60% of cyclohexanone. The polymerizable liquid crystal solution (1B) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized DV being obtained by passing ultraviolet rays generated from a high pressure mercury lamp through a polarizing filter and a band-pass filter, in the air for 30 seconds to cure the polymerizable liquid crystal composition. FIG. 10 shows an emission spectrum of a high pressure mercury lamp light source (before passing ultraviolet rays through a polarizing filter and a band-pass filter). The resultant film had a thickness of 3 µm and was an optically biaxial film. The front phase difference Re was 62.7 nm. After the film was heated at 230° C. for 1 hour, the front phase difference Re was decreased to 40.6 nm. Assuming that the phase difference before heating is 100%, the front phase difference Re was 64.8%. The haze of the film was 2.26%.

Example 10

The polymerizable liquid crystal solution (1B) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 µm and was an optically biaxial film. The front phase difference Re was 57.5 nm. After the film was heated at 230° C. for 1 hour, the front phase difference Re was decreased to 38.5 nm. Assuming that the phase difference before heating is 100%, the front phase difference Re was 67%. The haze was 1.54%.

Example 11

A polymerizable liquid crystal composition (1C) containing 95.84% of the polymerizable liquid crystal composition (1A) prepared in Reference Example 2, 3.33% of a photoinitiator Darocur TPO (manufactured by Ciba Specialty Chemicals) having an absorption band near 360 nm, and 0.83% of Irgacure 907 (manufactured by Ciba Specialty Chemicals) was prepared.

[Chem. 59]

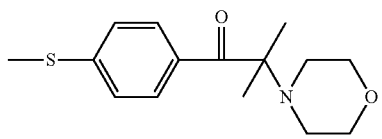

FIG. 11 shows an absorption spectrum of Irgacure 907.

A polymerizable liquid crystal solution (1C) was prepared so as to contain 40% of the polymerizable liquid crystal composition (1C) and 60% of cyclohexanone. The polymerizable liquid crystal solution (1C) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 µm and was an optically biaxial film. The front phase difference Re was 56.7 nm. After the film was heated at 230° C. for 1 hour, the front phase difference Re was decreased to 39.3 nm. Assuming that the phase difference before heating is 100%, the front phase difference Re was 69.3%. The haze of the film was 1.07%.

Example 12

The polymerizable liquid crystal solution (1C) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 μm and was an optically biaxial film. The front phase difference Re was 54.7 nm. After the film was heated at 230° C. for 1 hour, the front phase difference Re was decreased to 39.6 nm. Assuming that the phase difference before heating is 100%, the front phase difference Re was 72.4%. The haze was 0.67%.

Example 13

A polymerizable liquid crystal composition (1D) containing 95.84% of the polymerizable liquid crystal composition (1A) prepared in Reference Example 2, 2.91% of a photoinitiator Darocur TPO (manufactured by Ciba Specialty Chemicals) having an absorption band near 360 nm, and 1.25% of Irgacure 907 (manufactured by Ciba Specialty Chemicals) was prepared.

A polymerizable liquid crystal solution (1D) was prepared so as to contain 40% of the polymerizable liquid crystal composition (in) and 60% of cyclohexanone. The polymerizable liquid crystal solution (1D) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 52.2 nm. After the film was heated at 230° C. for 1 hour, the front phase difference Re was decreased to 38.3 nm. Assuming that the phase difference before heating is 100%, the front phase difference Re was 73.4%.

Example 14

The polymerizable liquid crystal solution (1D) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 μm and was an optically biaxial film. The front phase difference Re was 49.8 nm. After the film was heated at 230° C. for 1 hour, the front phase difference Re was decreased to 38.8 nm. Assuming that the phase difference before heating is 100%, the front phase difference Re was 77.9%.

Example 15

A polymerizable liquid crystal composition (1E) containing 95.84% of the polymerizable liquid crystal composition (1A) prepared in Reference Example 2 and 4.16% of a photoinitiator bis(2,4,6-trimethylbenzoyl)-phenyl phosphine oxide (Irgacure 819 manufactured by Ciba Specialty Chemicals) having an absorption band near 360 nm was prepared.

[Chem. 60]

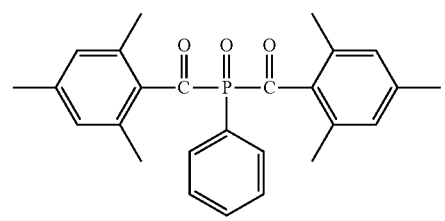

FIG. 12 shows an absorption spectrum of Irgacure 819.

A polymerizable liquid crystal solution (1E) was prepared so as to contain 40% of the polymerizable liquid crystal composition (1E) and 60% of cyclohexanone. The polymerizable liquid crystal solution (1E) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 59.7 nm. After the film was heated at 230° C. for 1 hour, the front phase difference Re was decreased to 39.0 nm. Assuming that the phase difference before heating is 100%, the front phase difference Re was 65.3%. The haze of the film was 0.38%.

Example 16

The polymerizable liquid crystal solution (1E) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 µm and was an optically biaxial film. The front phase difference Re was 54.5 nm. After the film was heated at 230° C. for 1 hour, the front phase difference Re was decreased to 36.9 nm. Assuming that the phase difference before heating is 100%, the front phase difference Re was 67.7%. The haze was 0.12%.

Example 17

A polymerizable liquid crystal composition (1F) containing 95.84% of the polymerizable liquid crystal composition (1A) prepared in Reference Example 2, 3.33% of a photoinitiator Irgacure 819 (manufactured by Ciba Specialty Chemicals) having an absorption band near 360 nm, and 0.83% of Irgacure 907 (manufactured by Ciba Specialty Chemicals) was prepared.

A polymerizable liquid crystal solution (1F) was prepared so as to contain 40% of the polymerizable liquid crystal composition (1F) and 60% of cyclohexanone. The polymerizable liquid crystal solution (1F) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 µm and was an optically biaxial film. The front phase difference Re was 60.2 nm. After the film was heated at 230° C. for 1 hour, the front phase difference Re was decreased to 40.2 nm. Assuming that the phase difference before heating is 100%, the front phase difference Re was 66.8%. The haze of the film was 0.57%.

Example 18

The polymerizable liquid crystal solution (1F) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 µm and was an optically biaxial film. The front phase difference Re was 57.0 nm. After the film was heated at 230° C. for 1 hour, the front phase difference Re was decreased to 43.0 nm. Assuming that the phase difference before heating is 100%, the front phase difference Re was 75.4%. The haze was 1.64%.

Example 19

A polymerizable liquid crystal composition (1G) containing 95.84% of the polymerizable liquid crystal composition (1A) prepared in Reference Example 2, 2.91% of a photoinitiator Irgacure 819 (manufactured by Ciba Specialty Chemicals) having an absorption band near 360 nm, and 1.25% of Irgacure 907 (manufactured by Ciba Specialty Chemicals) was prepared.

A polymerizable liquid crystal solution (1G) was prepared so as to contain 40% of the polymerizable liquid crystal composition (1G) and 60% of cyclohexanone. The polymerizable liquid crystal solution (1G) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 µm and was an optically biaxial film. The front phase difference Re was 52.4 nm. After the film was heated at 230° C. for 1 hour, the front phase difference Re was decreased to 36.9 nm. Assuming that the phase difference before heating is 100%, the front phase difference Re was 70.4%.

Example 20

The polymerizable liquid crystal solution (1G) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 μm and was an optically biaxial film. The front phase difference Re was 57.0 nm. After the film was heated at 230° C. for 1 hour, the front phase difference Re was decreased to 38.5 nm. Assuming that the phase difference before heating is 100%, the front phase difference Re was 70.4%.

Example 21

A polymerizable liquid crystal composition (1H) containing 95.84% of the polymerizable liquid crystal composition (1A) prepared in Reference Example 2, 3.33% of a photoinitiator Irgacure 819 (manufactured by Ciba Specialty Chemicals) having an absorption band near 360 nm, and 0.83% of Irgacure-369 was prepared.

[Chem. 61]

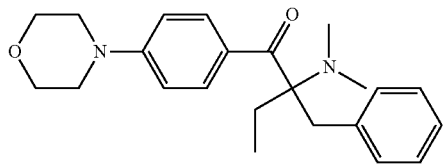

A polymerizable liquid crystal solution (1H) was prepared so as to contain 400 of the polymerizable liquid crystal composition (1H) and 60% of cyclohexanone. The polymerizable liquid crystal solution (1H) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 56.3 nm. After the film was heated at 230° C. for 1 hour, the front phase difference Re was decreased to 37.1 nm. Assuming that the phase difference before heating is 100%, the front phase difference Re was 65.9%.

Example 22

The polymerizable liquid crystal solution (1H) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. In addition, the polymerizable liquid crystal composition layer was irradiated with unpolarized UV (intensity: 30 mW/cm2), which is obtained without passing ultraviolet rays generated from the same high pressure mercury lamp through a polarizing filter or a band-pass filter, in the air for 27 seconds to perform additional curing. The resultant film had a thickness of 3 μm and was an optically biaxial film. The front phase difference Re was 49.5 nm. After the film was heated at 230° C. for 1 hour, the front phase difference Re was decreased to 35.5 nm. Assuming that the phase difference before heating is 100%, the front phase difference Re was 71.7%.

Example 23

A polymerizable liquid crystal composition (1I) containing 95.84% of the polymerizable liquid crystal composition (1A) prepared in Reference Example 2, 3.33% of a photoinitiator Darocur TPO (manufactured by Ciba Specialty Chemicals) having an absorption band near 360 nm, and 0.83% of Irgacure OXE01 (manufactured by Ciba Specialty Chemicals) was prepared.

[Chem. 62]

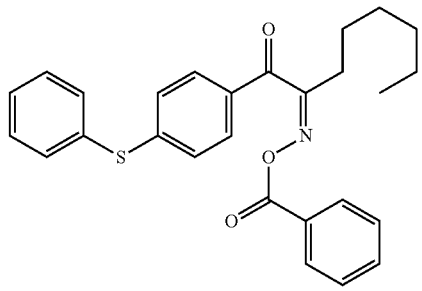

A polymerizable liquid crystal solution (1I) was prepared so as to contain 40% of the polymerizable liquid crystal composition (1I) and 60% of cyclohexanone. The polymerizable liquid crystal solution (1I) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 52.9 nm.

Example 24

A polymerizable liquid crystal composition (1J) containing 95.84% of the polymerizable liquid crystal composition (LA) prepared in Reference Example 2, 3.33% of a photoinitiator Darocur TPO (manufactured by Ciba Specialty Chemicals) having an absorption band near 360 nm, and 0.83% of Irgacure OXE02 (manufactured by Ciba Specialty Chemicals) was prepared.

[Chem. 63]

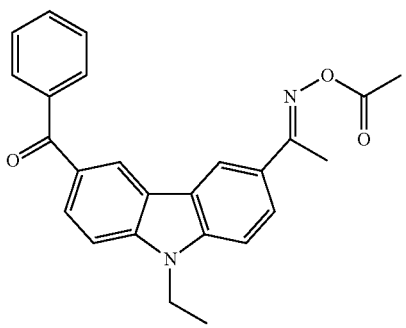

FIG. 14 shows an absorption spectrum of Irgacure OXE02.

A polymerizable liquid crystal solution (1J) was prepared so as to contain 40% of the polymerizable liquid crystal composition (1J) and 60% of cyclohexanone. The polymerizable liquid crystal solution (1J) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 47.0 nm.

Example 25

A polymerizable liquid crystal composition (1K) containing 95.84% of the polymerizable liquid crystal composition (1A) prepared in Reference Example 2 and 4.16% of Irgacure OXE01 (manufactured by Ciba Specialty Chemicals) having an absorption band near 360 nm was prepared.

A polymerizable liquid crystal solution (1K) was prepared so as to contain 40% of the polymerizable liquid crystal composition (1K) and 60% of cyclohexanone. The polymerizable liquid crystal solution (1K) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm²) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 40.6 nm. After the film was heated at 230° C. for 1 hour, the front phase difference Re was decreased to 30.5 nm. Assuming that the phase difference before heating is 100%, the front phase difference Re was 75.1%. The haze was 0.28%.

A polymerizable liquid crystal composition (1L) was prepared that contains 36.71% of a liquid crystal acrylate compound represented by the formula (IV-9-a),

[Chem. 64]

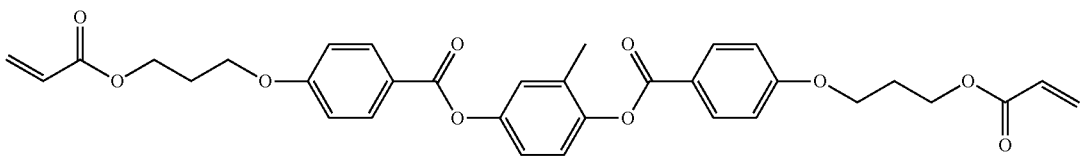

(IV-9-a)

15.74% of a liquid crystal acrylate compound represented by the formula (IV-9-b),

[Chem. 65]

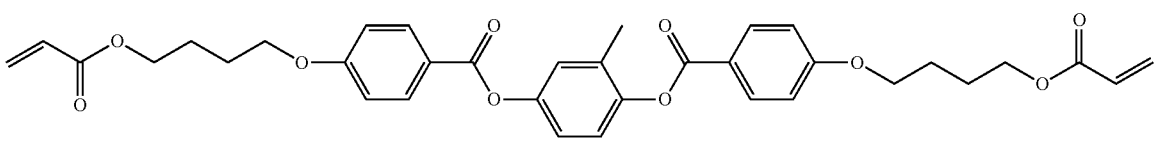

(IV-9-b)

13.11% of a liquid crystal acrylate compound represented by the formula (IV-8-a),

[Chem. 66]

(IV-8-a)

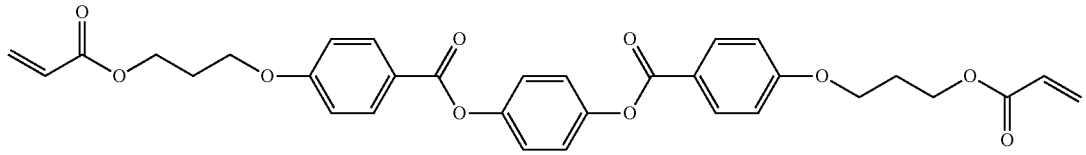

21.85% of a liquid crystal acrylate compound represented by the formula (I-5-a),

[Chem. 67]

(I-5-a)

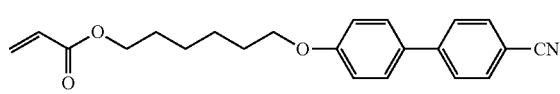

9.18% of a chiral acrylate compound represented by the formula (a-1),

[Chem. 68]

(a-1)

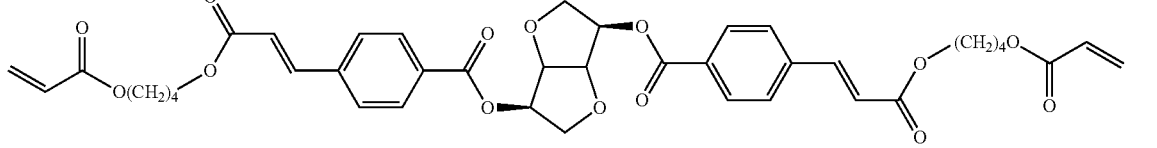

3.06% of a chiral acrylate compound represented by the formula (e-1),

[Chem. 69]

(e-1)

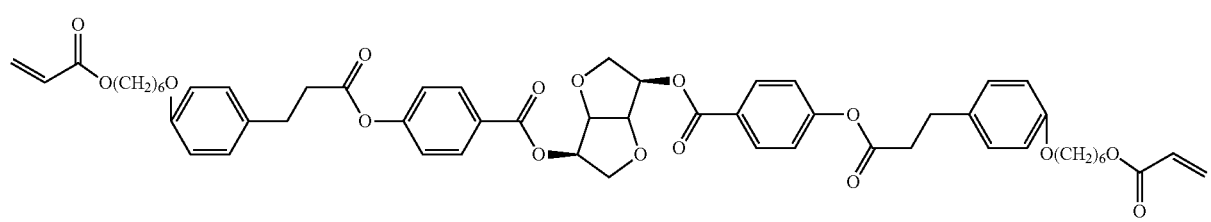

0.26% of liquid paraffin, and 0.09% of p-methoxyphenol. A polymerizable liquid crystal composition (1M) containing 95.84% of the polymerizable liquid crystal composition (1L), 3.33% of a photoinitiator Irgacure 819 (manufactured by Ciba Specialty Chemicals) having an absorption band near 360 nm, and 0.83% of Irgacure 907 (manufactured by Ciba Specialty Chemicals) was prepared.

A polymerizable liquid crystal solution (1M) was prepared so as to contain 40% of the polymerizable liquid crystal composition (1M) and 60% of cyclohexanone. The polymerizable liquid crystal solution (1M) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 18.0 nm.

Comparative Example 5

A polymerizable liquid crystal composition (1N) containing 95.84% of the polymerizable liquid crystal composition (1A) prepared in Reference Example 2 and 4.16% of a dichromatic initiator represented by formula (PI-1) was prepared.

[Chem. 70]

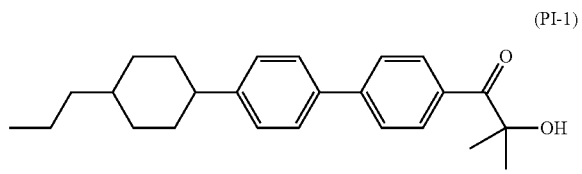

(PI-1)

stand at room temperature for 3 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds. However, the polymerizable liquid crystal composition layer was not cured. As is clear from the description above, in the case where a dichromatic initiator is used, a polymerizable liquid crystal composition cannot be cured in the air.

Table 1 collectively shows the results above. As is understood from the results above, when the polymerizable liquid crystal composition of the present invention is used, the front phase difference can be increased regardless of thickness.

TABLE 1

| | | | Front phase difference | | | |
|---|---|---|---|---|---|---|
| | | Additional curing (30 mW/cm2 × 27 seconds) | After curing (nm) | After heating at 230° C. for 1 hour (nm) | Percentage of change in phase difference (%) | Haze (%) |
| Example 9 | Darocur TPO 4.16% | No | 62.7 | 40.6 | 64.8 | 2.26 |
| Example 10 | Darocur TPO 4.16% | Yes | 57.5 | 38.5 | 67.0 | 1.54 |
| Example 11 | Darocur TPO 3.33% Irgacure 907 0.83% | No | 56.7 | 39.3 | 69.3 | 1.07 |
| Example 12 | Darocur TPO 3.33% Irgacure 907 0.83% | Yes | 54.7 | 39.6 | 72.4 | 0.67 |
| Example 13 | Darocur TPO 2.91% Irgacure 907 1.25% | No | 52.2 | 38.3 | 73.4 | |
| Example 14 | Darocur TPO 2.91% Irgacure 907 1.25% | Yes | 49.8 | 38.8 | 77.9 | |
| Example 15 | Irgacure 819 4.16% | No | 59.7 | 39.0 | 65.3 | 0.38 |
| Example 16 | Irgacure 819 4.16% | Yes | 54.5 | 36.9 | 67.7 | 0.12 |
| Example 17 | Irgacure 819 3.33% Irgacure 907 0.83% | No | 60.2 | 40.2 | 66.8 | 0.57 |
| Example 18 | Irgacure 819 3.33% Irgacure 907 0.83% | Yes | 57.0 | 43.0 | 75.4 | 1.64 |
| Example 19 | Irgacure 819 2.91% Irgacure 907 1.25% | No | 52.4 | 36.9 | 70.4 | |
| Example 20 | Irgacure 819 2.91% Irgacure 907 1.25% | Yes | 50.7 | 38.5 | 75.9 | |
| Example 21 | Irgacure 819 3.33% Irgacure 369 0.83% | No | 56.3 | 37.1 | 65.9 | |
| Example 22 | Irgacure 819 2.91% Irgacure 369 1.25% | No | 49.5 | 35.5 | 71.7 | |
| Example 23 | Darocur TPO 3.33% Irgacure OXE01 0.83% | No | 52.9 | | | |
| Example 24 | Darocur TPO 3.33% Irgacure OXE02 0.83% | No | 47.0 | | | |
| Example 25 | OXE-01 4.16% | No | 40.6 | 30.5 | 75.1 | 0.28 |
| Comparative Example 4 | Irgacure 819 3.33% Irgacure 907 0.83% (No addition of absorbing agent) | No | 18.0 | | | |
| Comparative Example 5 | Dichromatic initiator 4.16% | No | (not cured) | | | |

A polymerizable liquid crystal solution (1N) was prepared so as to contain 40% of the polymerizable liquid crystal composition (1N) and 60% of cyclohexanone. The polymerizable liquid crystal solution (1N) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to Example 26

A polymerizable liquid crystal composition (2E) of the present invention containing 99.0% of the polymerizable liquid crystal composition (1F) prepared in Example 17 and 1.0% of a non-liquid crystalline polymerizable compound PHE (manufactured by Dai-ichi Kogyo Seiyaku Co., Ltd.) was prepared.

[Chem. 71]

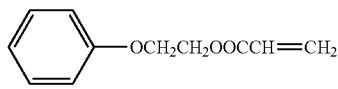
—OCH$_2$CH$_2$OOCCH=CH$_2$

A polymerizable liquid crystal solution (2E) was prepared so as to contain 40% of the polymerizable liquid crystal composition (2E) and 60% of cyclohexanone. The polymerizable liquid crystal solution (2E) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 8 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 63.0 nm. The haze of the film was 0.53%. Orientation defects were not found through the observation of the film with a polarization microscope.

Example 27

A polymerizable liquid crystal composition (2F) of the present invention containing 98.5% of the polymerizable liquid crystal composition (1F) prepared in Example 17 and 1.5% of a non-liquid crystalline polymerizable compound PHE (manufactured by Dai-ichi Kogyo Seiyaku Co., Ltd.) was prepared. A polymerizable liquid crystal solution (2F) was prepared so as to contain 40% of the polymerizable liquid crystal composition (2F) and 60% of cyclohexanone. The polymerizable liquid crystal solution (2F) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 8 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 65.5 nm. The haze of the film was 0.28%. Orientation defects were not found through the observation of the film with a polarization microscope.

Example 28

A polymerizable liquid crystal composition (2G) of the present invention containing 98.0% of the polymerizable liquid crystal composition (1F) prepared in Example 17 and 2.0% of a non-liquid crystalline polymerizable compound PHE (manufactured by Dai-ichi Kogyo Seiyaku Co., Ltd.) was prepared. A polymerizable liquid crystal solution (2G) was prepared so as to contain 40% of the polymerizable liquid crystal composition (2G) and 60% of cyclohexanone. The polymerizable liquid crystal solution (2G) was applied onto a glass substrate including a polyimide orientation film and subjected to a rubbing treatment, by spin coating (1000 revolutions per minute for 30 seconds). The substrate subjected to spin coating was dried at 60° C. for 2 minutes and then left to stand at room temperature for 8 minutes to cause the planar orientation of polymerizable liquid crystal. The resultant polymerizable liquid crystal composition layer was irradiated with polarized UV (intensity: 10 mW/cm$^2$) having a wavelength of 360 nm, the polarized UV being obtained by passing ultraviolet rays generated from a high pressure mercury lamp through a polarizing filter and a band-pass filter, in the air for 30 seconds to cure the polymerizable liquid crystal composition. The resultant film had a thickness of 3 μm and was an optically biaxial film. The front phase difference Re was 63.4 nm. The haze of the film was 0.26%. Orientation defects were not found through the observation of the film with a polarization microscope. Table 2 collectively shows the results above. It is understood from the comparison with Example 17 that the addition of a non-liquid crystalline polymerizable compound in a certain amount can decrease the haze.

TABLE 2

| | | Non-liquid crystalline polymerizable compound | Amount added (%) | Front phase difference (nm) | Haze (%) | Orientation defects |
|---|---|---|---|---|---|---|
| Example 26 | Irgacure 819 3.33% Irgacure 907 0.83% | PHE | 1.0 | 63.0 | 0.53 | absence |
| Example 27 | Irgacure 819 3.33% Irgacure 907 0.83% | PHE | 1.5 | 65.5 | 0.28 | absence |
| Example 28 | Irgacure 819 3.33% Irgacure 907 0.83% | PHE | 2.0 | 63.4 | 0.26 | absence |

Figure 1:
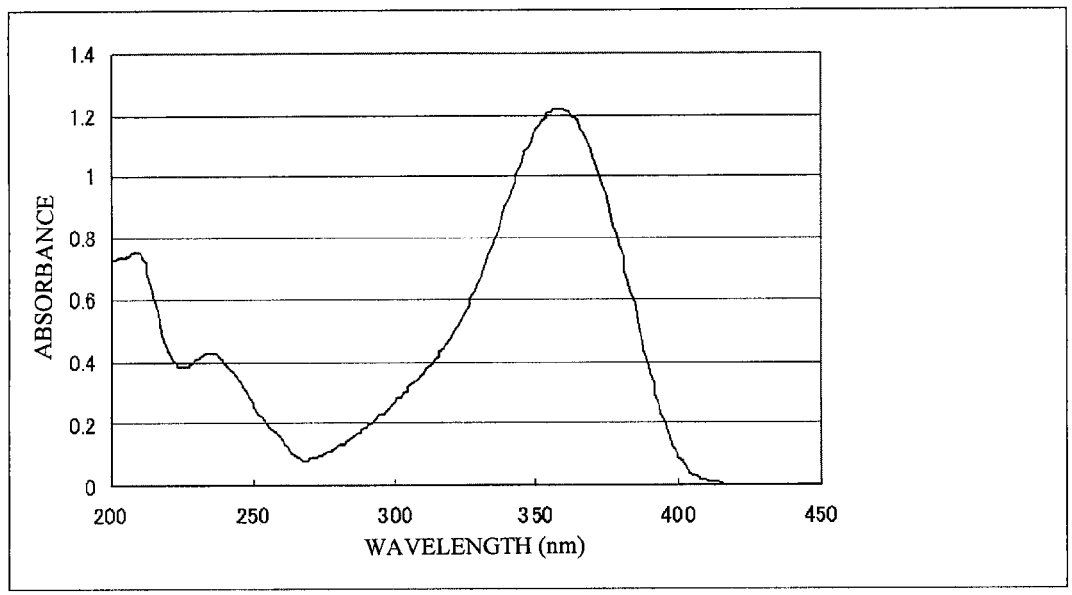
FIG. 1 is a spectrum (acetonitrile solution, 10 ppm, optical path length: 1 cm) of a light-absorbing agent represented by formula (X-1).
Figure 2:
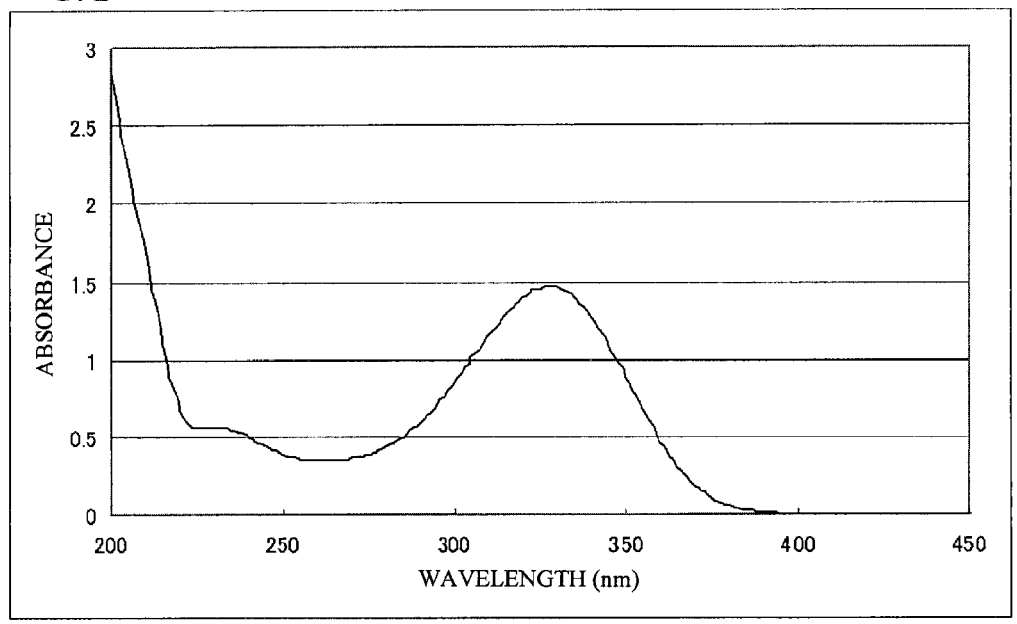
FIG. 2 is a spectrum (acetonitrile solution, 20 ppm) of a compound represented by formula (III-2a), which is a polymerizable liquid crystal compound having a light absorption band at a certain wavelength.
Figure 3:
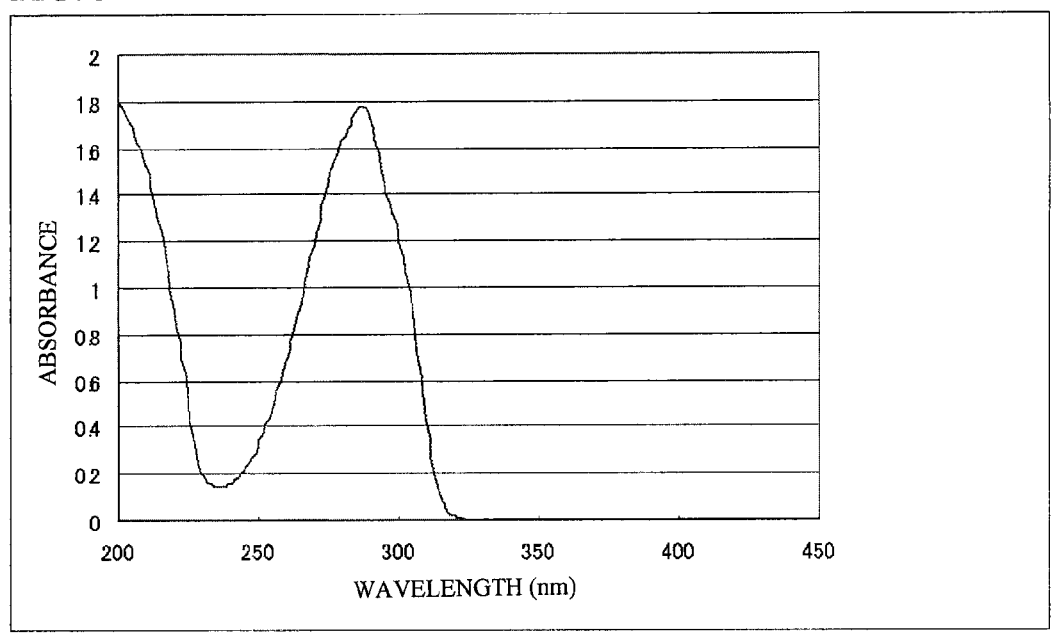
FIG. 3 is a spectrum (acetonitrile solution, 20 ppm) of a compound represented by formula (a-1).
Figure 4:
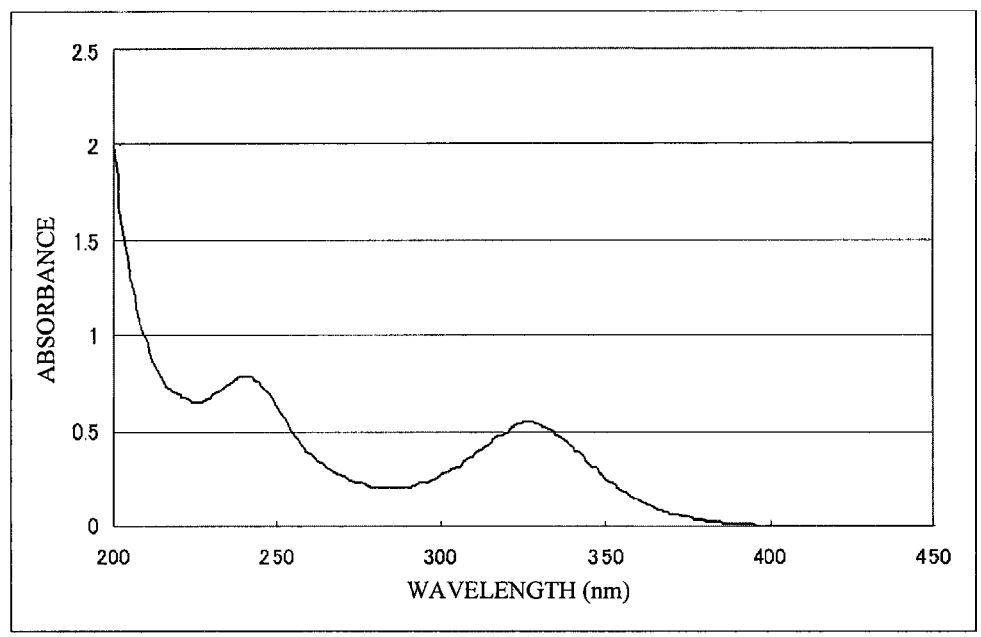
FIG. 4 is a spectrum (acetonitrile solution, 20 ppm) of Irgacure OXE-01.
Figure 5:
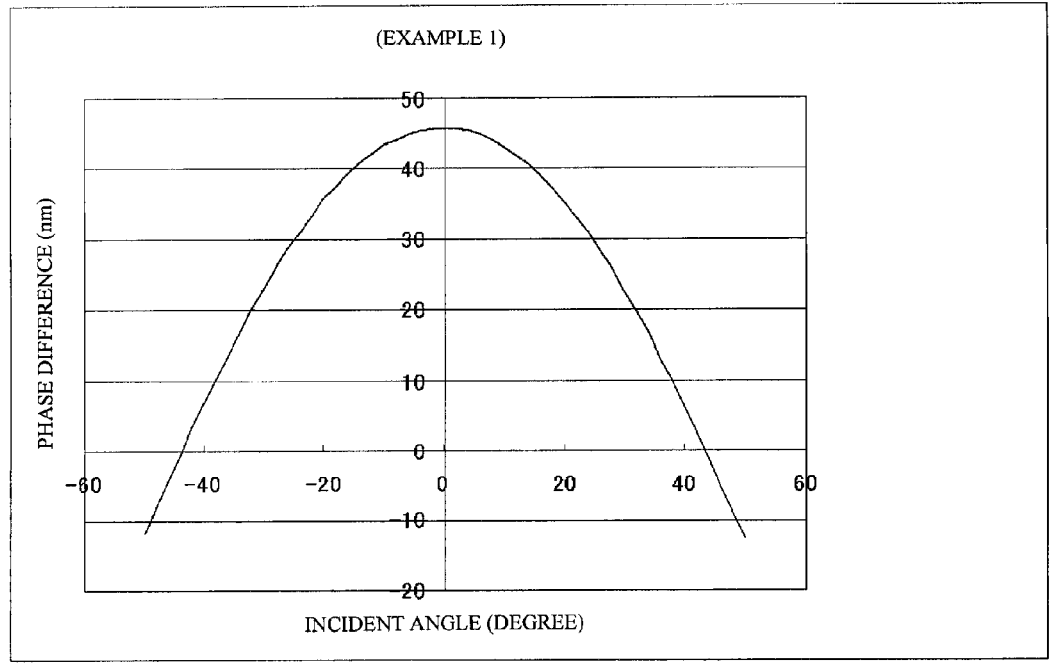
FIG. 5 is a graph showing a measurement result of the incident angle dependence of a phase difference of a biaxial film in Example 1.
Figure 6:
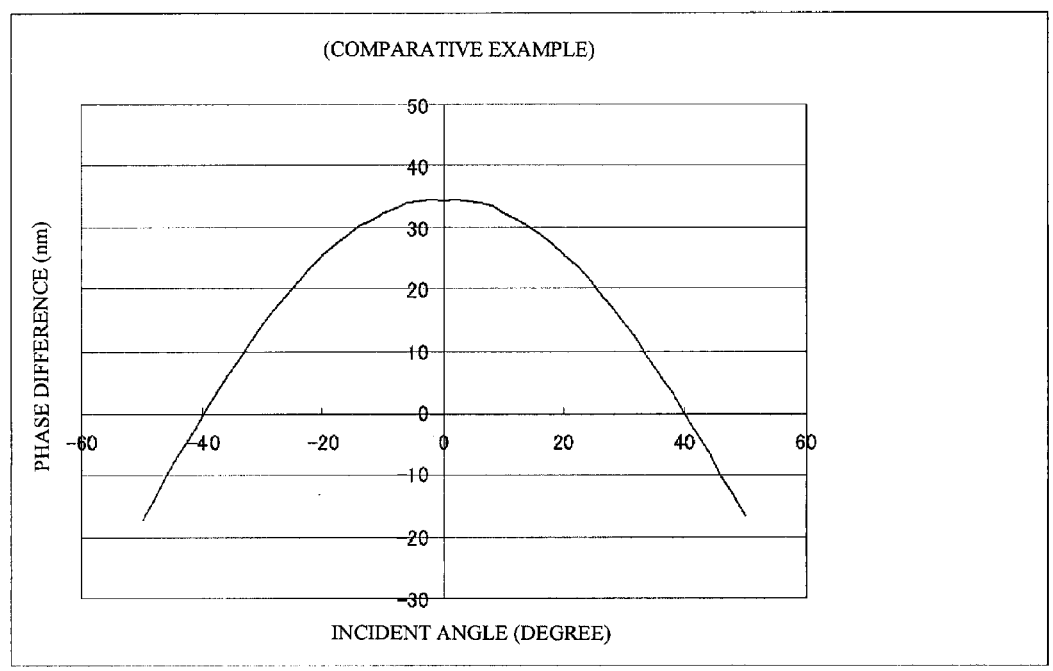
FIG. 6 is a graph showing a measurement result of the incident angle dependence of a phase difference of a biaxial film in Comparative Example 1.
Figure 7:
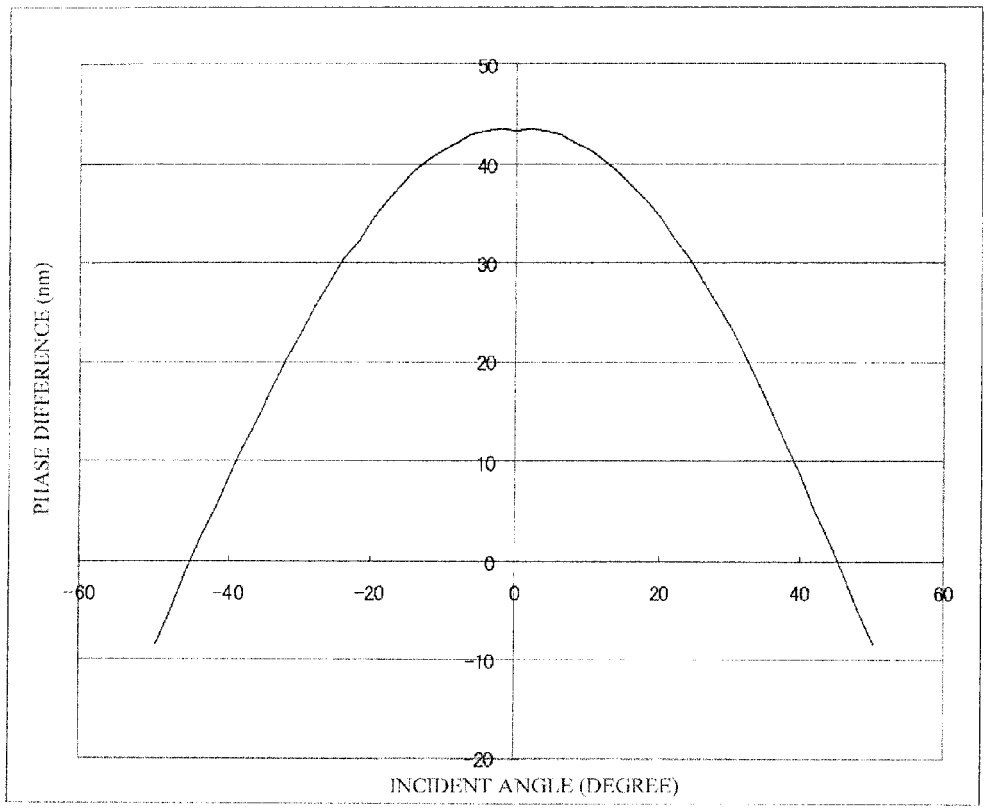
FIG. 7 is a graph showing a measurement result of the incident angle dependence of a phase difference of a biaxial film in Example 8.
Figure 8:
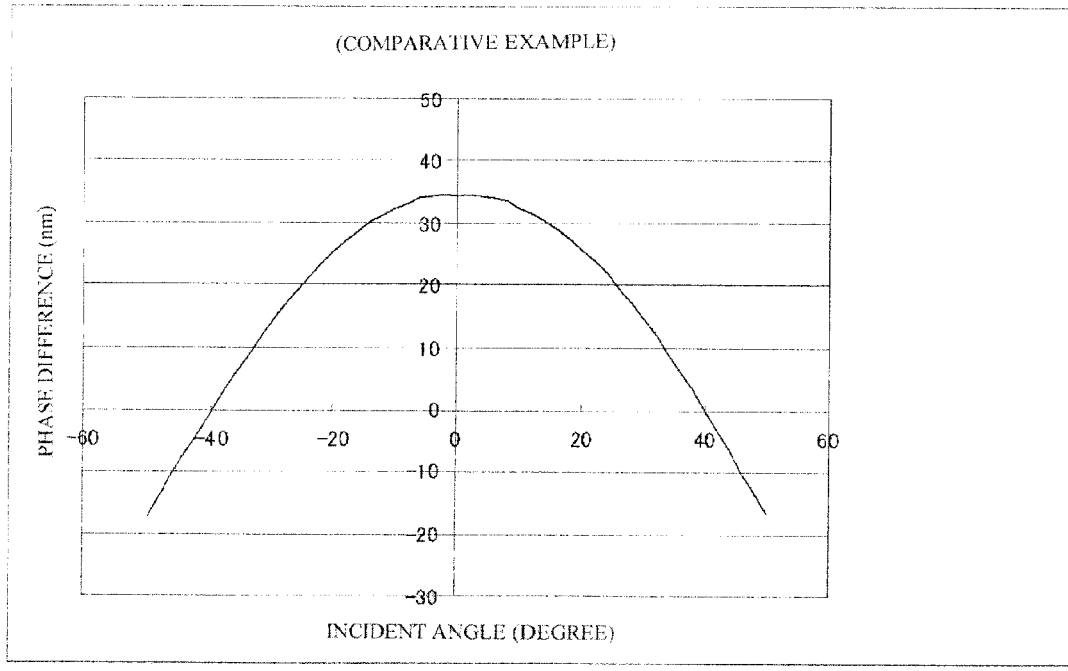
FIG. 8 is a graph showing a measurement result of the incident angle dependence of a phase difference of a biaxial film in Comparative Example 3.
Figure 9:
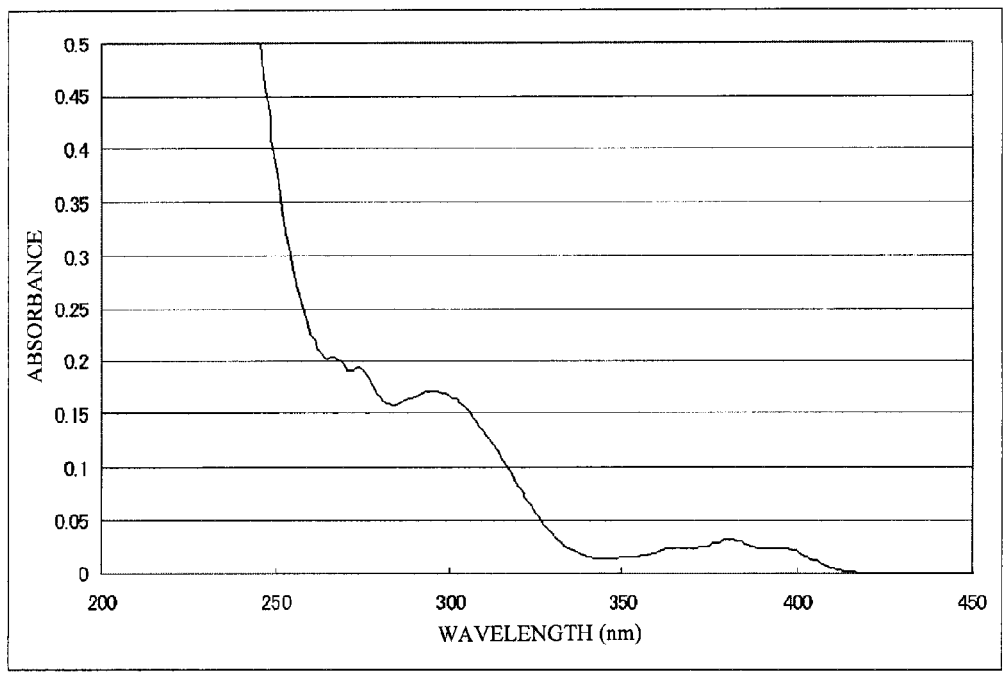
FIG. 9 is a spectrum (acetonitrile solution, 20 ppm, optical path length: 1 cm) of a photoinitiator Darocur TPO.
Figure 10:
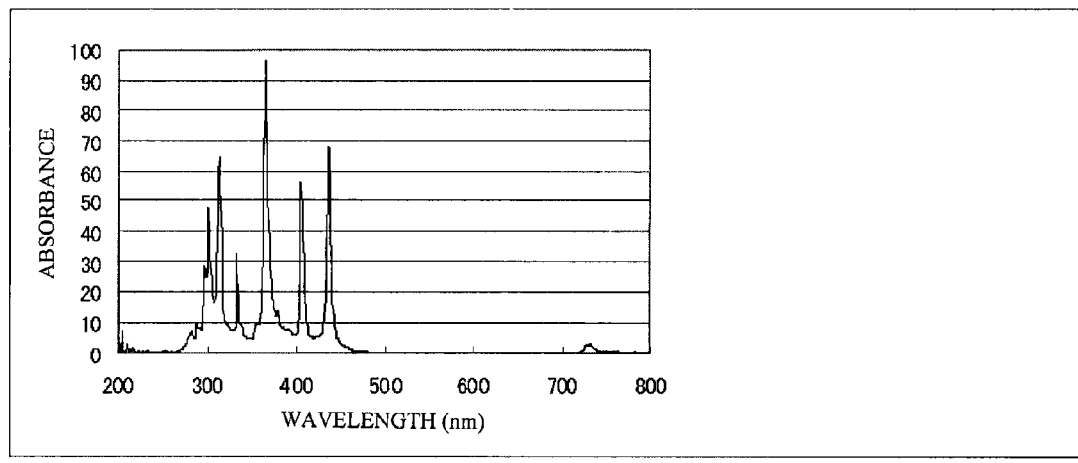
FIG. 10 is an emission spectrum of a high pressure mercury lamp (before passing ultraviolet rays through a polarizing filter and a band-pass filter).
Figure 11:
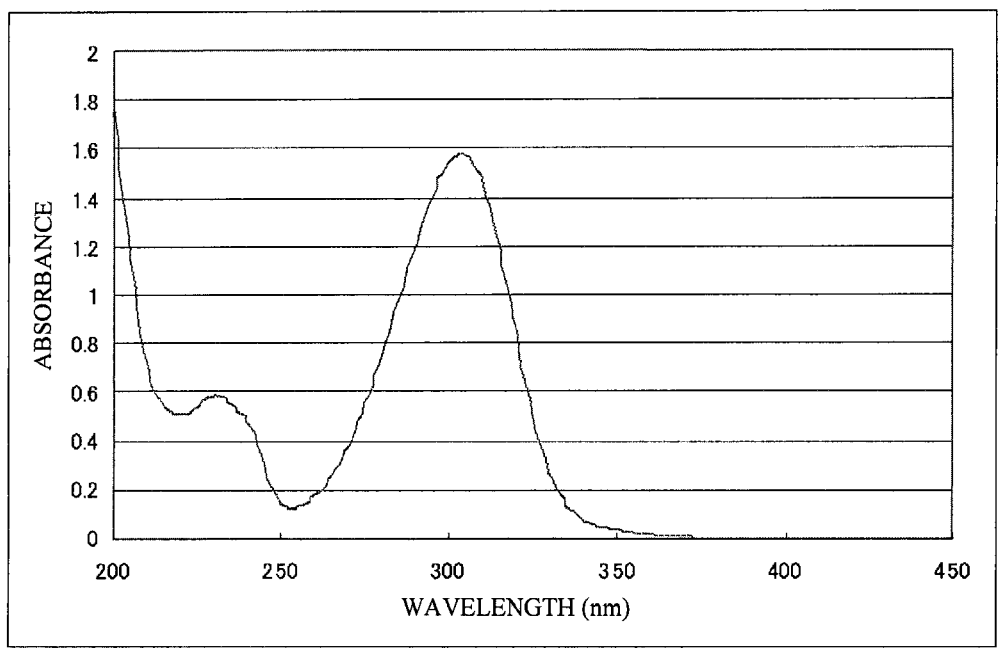
FIG. 11 is a spectrum (acetonitrile solution, 20 ppm, optical path length: 1 cm) of a photoinitiator Irgacure 907.
Figure 12:
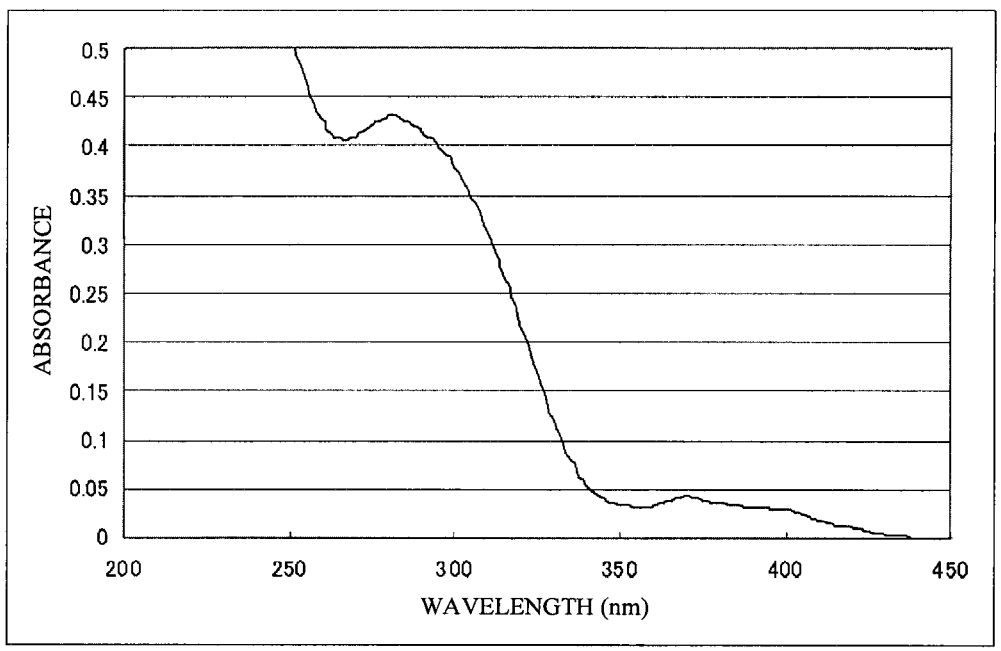
FIG. 12 is a spectrum (acetonitrile solution, 20 ppm, optical path length: 1 cm) of a photoinitiator Irgacure 819.
Figure 13:
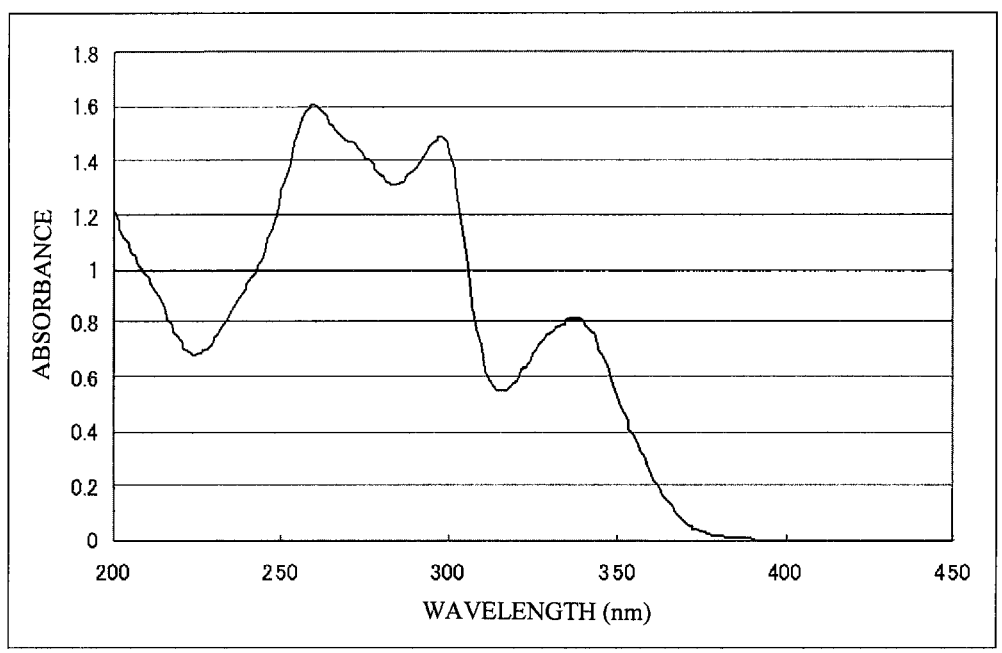
FIG. 13 is a spectrum (acetonitrile solution, 20 ppm, optical path length: 1 cm) of a photoinitiator Irgacure OXE02.

The invention claimed is:

1. A polymerizable liquid crystal composition comprising:
polymerizable liquid crystal compounds; and
a photoinitiator having a light absorption band in a wavelength range of 280 to 400 nm,
wherein:
(i) at least one of the polymerizable liquid crystal compounds has a light absorption band in a wavelength range of 320 to 400 nm, and
the difference between the peak wavelength of the light absorption band of the photoinitiator and the peak wavelength of the light absorption band of the at least one polymerizable liquid crystal compound having a light absorption band in the wavelength range of 320 to 400 nm is within 30 nm, or
the composition comprises a first photoinitiator having a light absorption band in a wavelength range of 320 to 380 nm and a second photoinitiator having a light absorption band in a wavelength range of 280 to below 320 nm; or
(ii) the composition further contains a light-absorbing agent having a light absorption band in a wavelength range of 280 to 400 nm, wherein the light-absorbing agent is a compound represented by general formula (X)

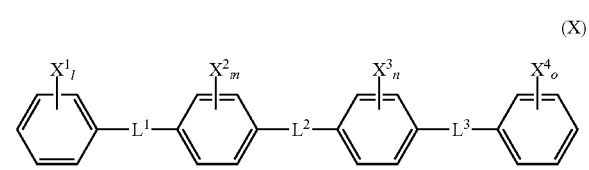
(X)

where $X^1$ to $X^4$ each independently represent a fluorine atom, an alkyl group, alkoxy group, acyl group, or alkoxycarboxy group having 1 to 18 carbon atoms, or an alkenyl group or alkenyloxy group having 2 to 18 carbon atoms; l and o each independently represent an integer of 1 to 5; m and n each independently represent an integer of 1 to 4; and $L^1$ to $L^3$ each independently represent a single bond or —CH=CH—, but at least two of $L^1$ to $L^3$ represent —CH=CH—.

2. The polymerizable liquid crystal composition according to claim 1, comprising the light-absorbing agent has having a light absorption band in a wavelength range of 280 to 400 nm wherein the light-absorbing agent is a compound represented by general formula (X).

3. The polymerizable liquid crystal composition according to claim 2, wherein the difference between peak wavelength of the light absorption band of the photoinitiator and peak wavelength of the light absorption band of the light-absorbing agent is within 30 nm.

4. The polymerizable liquid crystal composition according to claim 2, wherein the photoinitiator has a double bond in the skeleton thereof.

5. The polymerizable liquid crystal composition according to claim 1, wherein the difference between in peak wavelength of the light absorption band of the photoinitiator and peak wavelength of the light absorption band of the at least one polymerizable liquid crystal compound having a light absorption band in the wavelength range of 320 to 400 nm is within 30 nm.

6. The polymerizable liquid crystal composition according to claim 1, wherein the at least one polymerizable liquid crystal compound having a light absorption band in the wavelength range of 320 to 400 nm has a double bond in the skeleton thereof.

7. The polymerizable liquid crystal composition according to claim 1, further containing a chiral compound so as to exhibit a chiral nematic phase.

8. The polymerizable liquid crystal composition according to claim 1, being cured with an ultraviolet ray having a wavelength of 280 to 400 nm in the air.

9. The polymerizable liquid crystal composition according to claim 8, being cured at an ultraviolet dose of 4000 mJ/cm² or less.

10. The polymerizable liquid crystal composition according to claim 1, wherein the at least one photoinitiator is an oxime-based compound.

11. The polymerizable liquid crystal composition according to claim 1, wherein the photoinitiator is an acylphosphine oxide-based compound.

12. The polymerizable liquid crystal composition according to claim 1, wherein the composition comprises a first photoinitiator having a light absorption band in a wavelength range of 320 to 380 nm and a second photoinitiator having a light absorption band in a wavelength range of 280 to below 320 nm.

13. The polymerizable liquid crystal composition according to claim 1, wherein the compound represented by the general formula (X) is a compound represented by general formula (Xa)

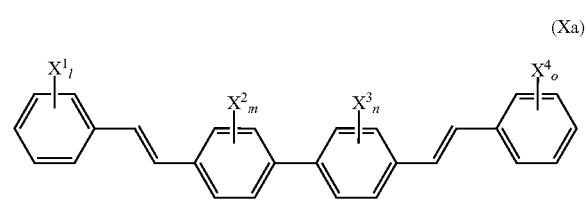
(Xa)

where $X^1$ to $X^4$ each independently represent a fluorine atom, an alkyl group, alkoxy group, acyl group, or alkoxycarboxy group having 1 to 18 carbon atoms, or an alkenyl group or alkenyloxy group having 2 to 18 carbon atoms; l and o each independently represent an integer of 1 to 5; and m and n each independently represent an integer of 1 to 4.

14. The polymerizable liquid crystal composition according to claim 1, wherein the at least one of the polymerizable liquid crystal compound having a light absorption band in a wavelength range of 320 to 400 nm is a compound represented by general formula (I)

$$P—(Sp)_m-Z0-(A1-Z1)_n-A2-Z2-A3-Z3-R^1 \quad (I)$$

where Sp represents an alkylene group having 1 to 20 carbon atoms, the alkylene group may be substituted with at least one halogen atom or CN, and, in the alkylene group, a CH$_2$ group or two or more CH$_2$ groups that are not adjacent to each other may be each independently substituted with —O—, —S—, —NH—, —N(CH$_3$)—, —CO—, —COO—, —OCO—, —OCOO—, —SCO—, —COS—, or —C≡C— without directly bonding oxygen atoms with each other;

A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a fluorene-2,7-diyl group, formula (I-b-1), formula (I-b-2), or formula (I-b-3);

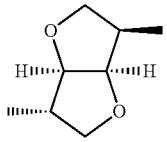

(I-b-1)

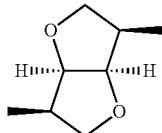

(I-b-2)

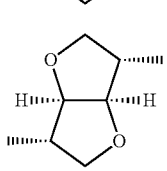

(I-b-3)

the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may have, as a substituent, at least one F, Cl, CF$_3$,

[Chem. 7]

OCF$_3$, cyano group, alkyl group, alkoxy group, alkanoyl group, or alkanoyloxy group having 1 to 8 carbon atoms, or alkenyl group, alkenyloxy group, alkenoyl group, or alkenoyloxy group having 2 to 8 carbon atoms;

Z0, Z1, Z2, and Z3 each independently represent —COO—, —OCO—, —CH$_2$CH$_2$—, —OCH$_2$—, —CH$_2$O—, —CH═CH—, —CC—, —CH═CHCOO—, —OCOCH═CH—, —CH$_2$CH$_2$COO—, —CH$_2$CH$_2$OCO—, —COOCH$_2$CH$_2$—, —OCOCH$_2$CH$_2$—, —CONH—, —NHCO—, —CH═N—, —N═CH—, —N═N—, —CH═N—N═CH—, or a single bond, and at least one of Z0, Z1, and Z2 represents —CH═CH—, —CH═CHCOO—, —OCOCH═CH—, —CH═N—, —N═CH—, —N═N—, or —CH═N—N═CH—;

m represents 0 or 1 and n represents 0, 1, 2, or 3;

P represents a substituent selected from the group consisting of substituents represented by general formula (I-c) and general formula (I-d)

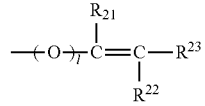

(I-c)

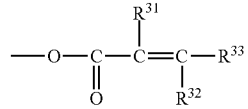

(I-d)

where R$^{21}$, R$^{22}$, R$^{23}$, R$^{31}$, R$^{32}$, and R$^{33}$ each independently represent a hydrogen atom, a halogen atom, or an alkyl group having 1 to 5 carbon atoms, and l represents 0 or 1; and R$^1$ represents a halogen atom, a cyano group, or an alkyl group having 1 to 25 carbon atoms, and the alkyl group may be substituted with at least one halogen atom or CN, and, in the alkyl group, a CH$_2$ group or two or more CH$_2$ groups that are not adjacent to each other may be each independently substituted with —O—, —S—, —NH—, —N(CH$_3$)—, —CO—, —COO—, —OCO—, —OCOO—, —SCO—, —COS—, or —C≡C— without directly bonding oxygen atoms with each other, or R$^1$ represents a structure represented by general formula (I-a)

-(Sp)$_m$—P  (I-a)

where P, Sp, and m have the same meaning as those in the general formula (I), but the two P, the two Sp, and the two m may be the same or different from each other.

15. The polymerizable liquid crystal composition according to claim 14, wherein the compound represented by the general formula (I) is a compound represented by general formula (II)

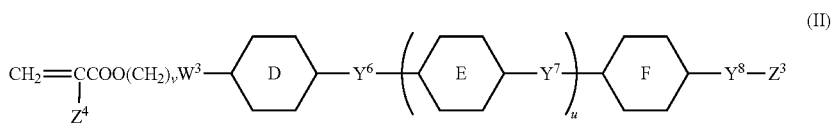

(II)

(in the formula, Z$^3$ represents a hydrogen atom, a halogen atom, a cyano group, or a hydrocarbon group having 1 to 20 carbon atoms; Z$^4$ represents a hydrogen atom or a methyl group; W$^3$ represents a single bond, —O—, —COO—, or —OCO—; v represents an integer of 0 to 18; u represents 0 or 1; D, E, and F each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; $Y^6$ and $Y^7$ each independently represent a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2CH$=CH—, —CH=CHCOO—, —OCOCH=CH—, —$CH_2CH_2COO$—, —$CH_2CH_2OCO$—, —$COOCH_2CH_2$—, —$COOCH_2CH_2$—, —CH=N—, —N=CH—, —N=N—, or —CH=N—N=CH—, and at least one of $Y^6$ and $Y^7$ represents —CH=CH—, —CH=CHCOO—, —OCOCH=CH—, —CH=N—, —N=CH—, —N=N—, or —CH=N—N=CH—; $Y^8$ represents a single bond, —O—, —COO—, —OCO—, or —CH=CHCOO—; and v represents an integer of 2 to 18 if $W^3$ represents a single bond).

16. The polymerizable liquid crystal composition according to claim 14, wherein the compound represented by the general formula (I) is a compound represented by general formula (III)

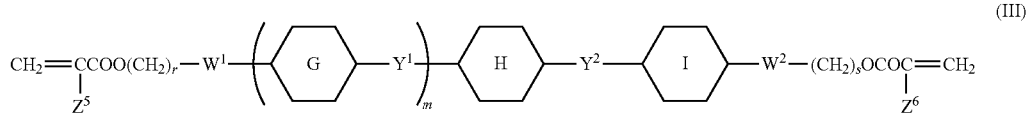

(III)

where $Z^5$ and $Z^6$ each independently represent a hydrogen atom or a methyl group; G, H, and I each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; m represents an integer of 0 to 3; $W^1$ and $W^2$ each independently represent a single bond, —O—, —COO—, or —OCO—; $Y^1$ and $Y^2$ each independently represent a single bond, —COO—, —OCO—, —$CH_2CH_2COO$—, —$CH_2CH_2OCO$—, —$COOCH_2CH_2$—, —$OCOCH_2CH_2$—, —CH=N—, —N=CH—, —N=N—, —CH=N—N=CH—, or a single bond, and at least one of $Y^1$ and $Y^2$ represents —CH=CH—, —CH=CHCOO—, —OCOCH=CH—, —N=CH—, —N=N—, or —CH=N—N=CH—; r and each independently represent an integer of 2 to 18; and the 1,4-phenylene group in the formula may be substituted with at least one alkyl group, alkoxy group, or alkanoyl group having 1 to 7 carbon atoms, cyano group, or halogen atom.

17. The polymerizable liquid crystal composition according to claim 14, wherein the concentration of the compound represented by the general formula (I) is 0.1 to 4%.

18. The polymerizable liquid crystal composition according to claim 1, wherein each of the polymerizable liquid crystal compounds is a compound represented by general formula (IV)

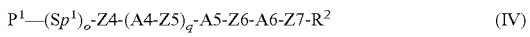

(IV)

where $Sp^1$ represents an alkylene group having 1 to 20 carbon atoms (the alkylene group may be substituted with at least one halogen atom or CN, and, in the alkylene group, a $CH_2$ group or two or more $CH_2$ groups that are not adjacent to each other may be each independently substituted with —O—, —S—, —NH—, —N($CH_3$)—, —CO—, —COO—, —OCO—, —OCOO—, —SCO—, —COS—, or —C≡C— without directly bonding oxygen atoms with each other;

A4, A5, and A6 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, the 1,2,3,4-tetrahydronaphthalene-2,6-diyl group, the 2,6-naphthylene group, the phenanthrene-2, 7-diyl group, the 9,10-dihydrophenanthrene-2,7-diyl group, the 1,2,3,4,4a,9,10a-octahydrophenanthrene-2, 7-diyl group, and the fluorene-2,7-diyl group may have, as a substituent, at least one F, Cl, $CF_3$, $OCF_3$, cyano group, alkyl group, alkoxy group, alkanoyl group, or alkanoyloxy group having 1 to 8 carbon atoms, or alkenyl group, alkenyloxy group, alkenoyl group, or alkenoyloxy group having 2 to 8 carbon atoms;

Z4, Z5, Z6, and Z7 each independently represent —COO—, —OCO—, —$CH_2CH_2$—, —$OCH_2$—, —$CH_2O$—, —C≡C—, —$CH_2CH_2COO$—, —$CH_2CH_2OCO$—, —$COOCH_2CH_2$—, —$OCOCH_2CH_2$—, —CONH—, —NHCO—, or a single bond;

o represents 0 or 1;

q represents 0, 1, 2, or 3;

$P^1$ represents a substituent selected from the group consisting of substituents represented by general formula (IV-c) and general formula (IV-d)

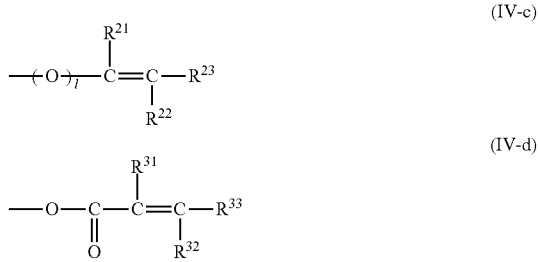

where $R^{21}$, $R^{22}$, $R^{23}$, $R^{31}$, $R^{32}$, and $R^{33}$ each independently represent a hydrogen atom, a halogen atom, or an alkyl group having 1 to 5 carbon atoms, and l represents 0 or 1; and $R^2$ represents a halogen atom, a cyano group, or an alkyl group having 1 to 25 carbon atoms, and the alkyl group may be substituted with at least one halogen atom or CN, and, in the alkyl group, a $CH_2$ group or two or more $CH_2$ groups that are not adjacent to each other may be each independently substituted with —O—, —S—, —NH—, —N($CH_3$)—, —CO—, —COO—, —OCO—, —OCOO—, —SCO—, —COS—, or —C≡C— without directly bonding oxygen atoms with each other, or $R^2$ represents a structure represented by general formula (IV-a)

—(Sp$^1$)$_o$—P$^1$ (IV-a)

where $P^1$, $Sp^1$, and o have the same meaning as those in the general formula (IV), but the two $P^1$, the two $Sp^1$, and the two o may be the same or different from each other.

19. The polymerizable liquid crystal composition according to claim 18, wherein the compound represented by the general formula (IV) is a compound represented by general formula (V)

[Chem. 12]

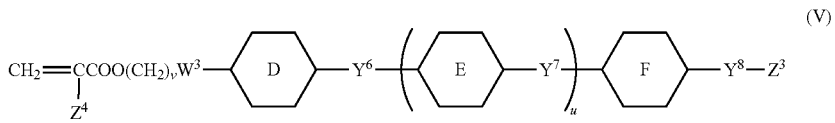

(in the formula, $Z^3$ represents a hydrogen atom, a halogen atom, a cyano group, or a hydrocarbon group having 1 to 20 carbon atoms; $Z^4$ represents a hydrogen atom or a methyl group; $W^3$ represents a single bond, —O—, —COO—, or —OCO—; v represents an integer of 0 to 18; u represents 0 or 1; D, E, and F each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; $Y^6$ and $Y^7$ each independently represent a single bond, —$CH_2CH_2$—, —$CH_2O$—, —$OCH_2$—, —COO—, —COO—, —C≡C—, —$(CH_2)_4$—, —$CH_2CH_2CH_2O$—, —$OCH_2CH_2CH_2$—, —$CH_2CH_2COO$—, —$CH_2CH_2OCO$—, —$COOCH_2CH_2$—, or —$OCOCH_2CH_2$—; $Y^8$ represents a single bond, —O—, —COO—, or —OCO—; and v represents an integer of 2 to 18 if $W^3$ represents a single bond).

20. The polymerizable liquid crystal composition according to claim 18, wherein the compound represented by the general formula (IV) is a compound represented by general formula (VI)

where $Z^5$ and $Z^6$ each independently represent a hydrogen atom or a methyl group; G, H, and I each independently represent a 1,4-phenylene group, a 1,4-phenylene group in which a CH group that is not adjacent to another CH group is substituted with nitrogen, a 1,4-cyclohexylene group, a 1,4-cyclohexylene group in which a $CH_2$ group or two $CH_2$ groups that are not adjacent to each other are substituted with an oxygen atom or a sulfur atom, or a 1,4-cyclohexenylene group, and the 1,4-phenylene group in the formula may be substituted with at least one alkyl group, alkoxy group, or alkanoyl group having 1 to 7 carbon atoms, cyano group, or halogen atom; m represents an integer of 0 to 3; $W^1$ and $W^2$ each independently represent a single bond, —O—, —COO—, or —OCO—; $Y^1$ and $Y^2$ each independently represent a single bond, —COO—, —OCO—, —$CH_2CH_2COO$—, —$CH_2CH_2OCO$—, —$COOCH_2CH_2$—, or —$OCOCH_2CH_2$—; r and s each independently represent an integer of 2 to 18; and the 1,4-phenylene group in the formula may be substituted with at least one alkyl group, alkoxy group, or alkanoyl group having 1 to 7 carbon atoms, cyano group, or halogen atom.

21. The polymerizable liquid crystal composition according to claim 1, wherein the polymerizable liquid crystal composition contains a disc-shaped liquid crystal compound having a structure in which a benzene derivative, a triphenylene derivative, a truxene derivative, a phthalocyanine derivative, or a cyclohexane derivative serves as a mother nucleus, which is the center of a molecule, and the mother nucleus radially has a linear alkyl group, a linear alkoxy group, or a substituted benzoyloxy group as the side chain thereof.

22. The polymerizable liquid crystal composition according to claim 21, wherein the disc-shaped compound is a compound represented by general formula (VII)

[Chem. 14]

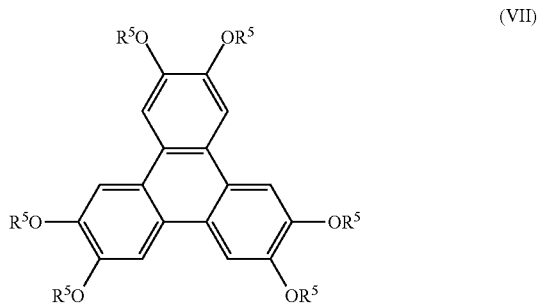

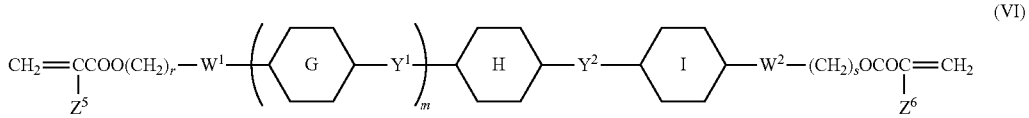

(in the formula, $R^5$ each independently represent a substituent represented by general formula (VII-a))

[Chem. 15]

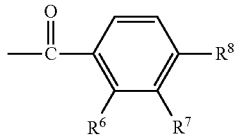

(VII-a)

(in the formula, $R^6$ and $R^7$ each independently represent a hydrogen atom, a halogen atom, or a methyl group; $R^8$ represents an alkoxy group having 1 to 20 carbon atoms; and a hydrogen atom in the alkoxy group may be substituted with a substituent represented by general formula (VII-b) or general formula (V-c))

[Chem. 16]

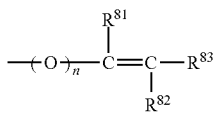

(VII-b)

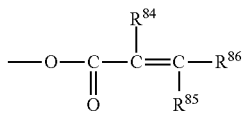

(VII-c)

(in the formula, $R^{81}$, $R^{82}$, $R^{83}$, $R^{84}$, $R^{85}$, and $R^{86}$ each independently represent a hydrogen atom, a halogen atom, or an alkyl group having 1 to 5 carbon atoms, and n represents 0 or 1).

23. The polymerizable liquid crystal composition according to claim 1, wherein the polymerizable liquid crystal composition further contains 0.5 to 5% of a non-liquid crystalline polymerizable compound.

24. The polymerizable liquid crystal composition according to claim 23, wherein the non-liquid crystalline polymerizable compound has a benzene ring.

25. An optically anisotropic body obtained by curing the polymerizable liquid crystal composition according to claim 1.

* * * * *